United States Patent
Takaoka et al.

(10) Patent No.: US 6,477,188 B1
(45) Date of Patent: Nov. 5, 2002

(54) LIGHT SOURCE

(75) Inventors: Eiko Takaoka; Masahiro Horiguchi, both of Tokyo; Kyoichi Deki, Mishima, all of (JP)

(73) Assignee: Kabushiki Kaisya Ushiosougougizyutsukenkyusyo, Tokyo (JP)

(*) Notice: Subject to any disclaimer, the term of this patent is extended or adjusted under 35 U.S.C. 154(b) by 0 days.

(21) Appl. No.: 09/308,234
(22) PCT Filed: Sep. 10, 1998
(86) PCT No.: PCT/JP98/04077
§ 371 (c)(1), (2), (4) Date: Jul. 19, 1999
(87) PCT Pub. No.: WO99/14631
PCT Pub. Date: Mar. 25, 1999

(30) Foreign Application Priority Data

Sep. 17, 1999 (JP) .............................. 9-251799

(51) Int. Cl.$^7$ ............................................. H01S 3/10
(52) U.S. Cl. ........................................................ 372/22
(58) Field of Search ..................................... 372/21, 22

(56) References Cited

U.S. PATENT DOCUMENTS 5,274,651 A * 12/1993 Urakami ..................... 372/21
5,912,910 A * 6/1999 Sanders et al. ............... 372/22
5,940,418 A * 8/1999 Shields ........................ 372/22

FOREIGN PATENT DOCUMENTS

JP         10-303488         11/1998

OTHER PUBLICATIONS

Japanese Abstract 10–153806, Jun. 9, 1998, Horiguchi Masahiro Deki Kyoichi, English Abstract.

* cited by examiner

Primary Examiner—Leon Scott, Jr.
(74) Attorney, Agent, or Firm—Nixon Peabody LLP; David S. Safran

(57) ABSTRACT

Light source device which can be used as a replacement light source for an ArI excimer laser. The light emitted from a Nd:YAG laser light source (L1) is incident on a nonlinear optical crystal (C1) and produces a second harmonic which is transmitted to a titanium-sapphire laser light source (L2). The light emitted by the titanium-sapphire laser light source (L2) is incident on nonlinear optical crystals (C2, C3) by which coherent light (W2) as the third harmonic is obtained. Light with a summed frequency of 193 nm is obtained by the means for producing a summed frequency (C4). Furthermore, by vector-phase matching the decrease of the conversion efficiency due to heat-induced phase-mismatch can be reduced. In addition, instead of the Nd:YAG laser light source a laser light source such as Nd:YLF, Nd:YVO$_4$ or the like and instead of the titanium-sapphire laser light source (L2) a photoparametric oscillator can be used.

9 Claims, 22 Drawing Sheets

Fig.1(a) Coaxial matching
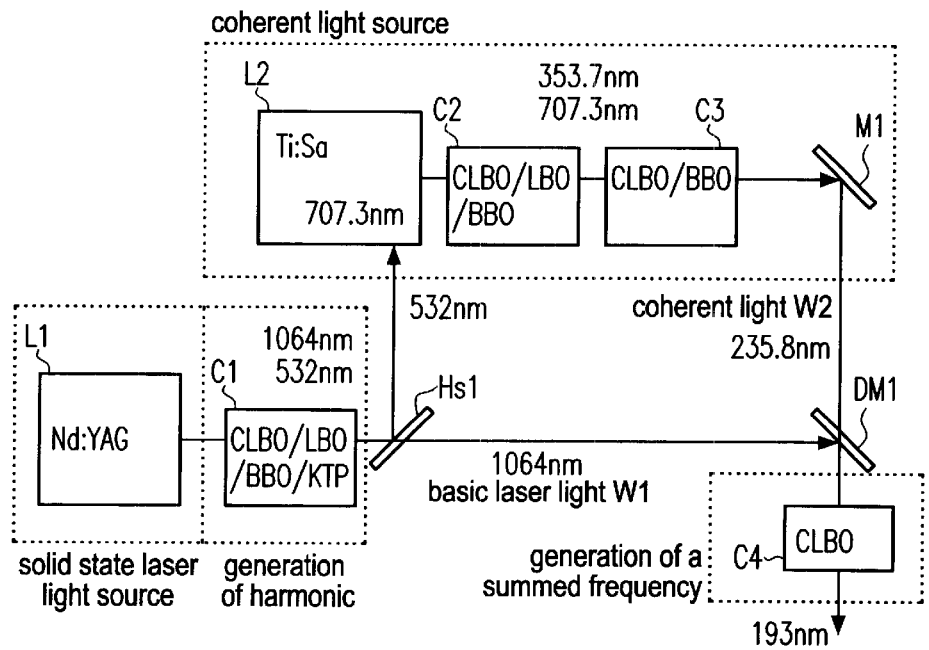
Fig.1(b) Vector-phase matching
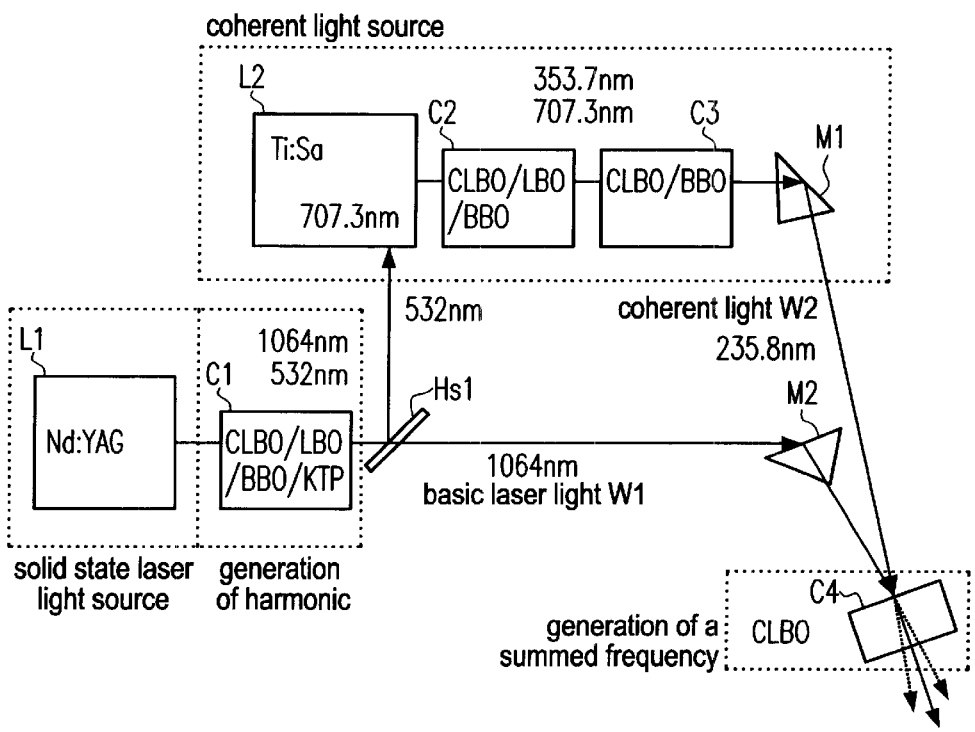

Fig.2(a) Coaxial matching
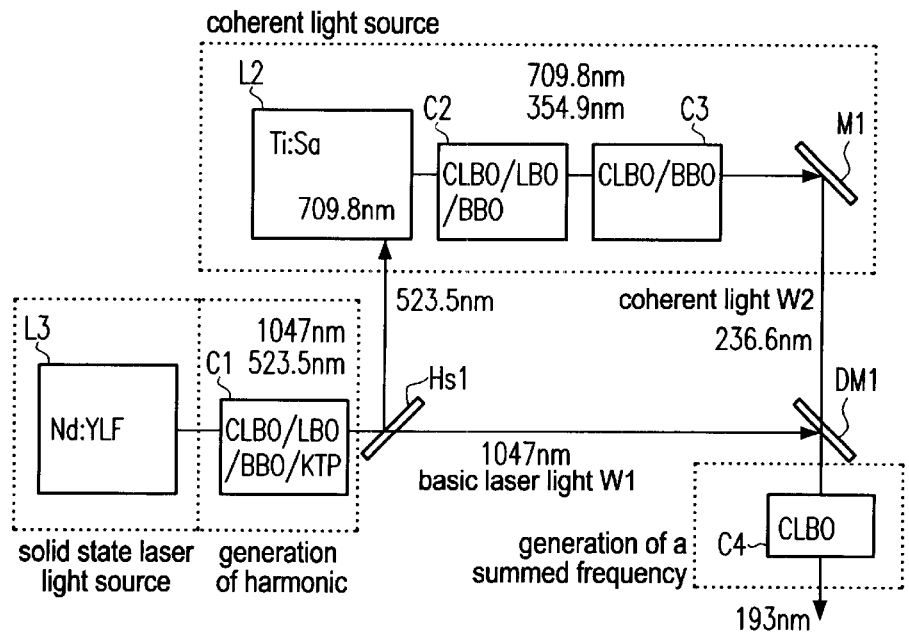
Fig.2(b) Vector-phase matching
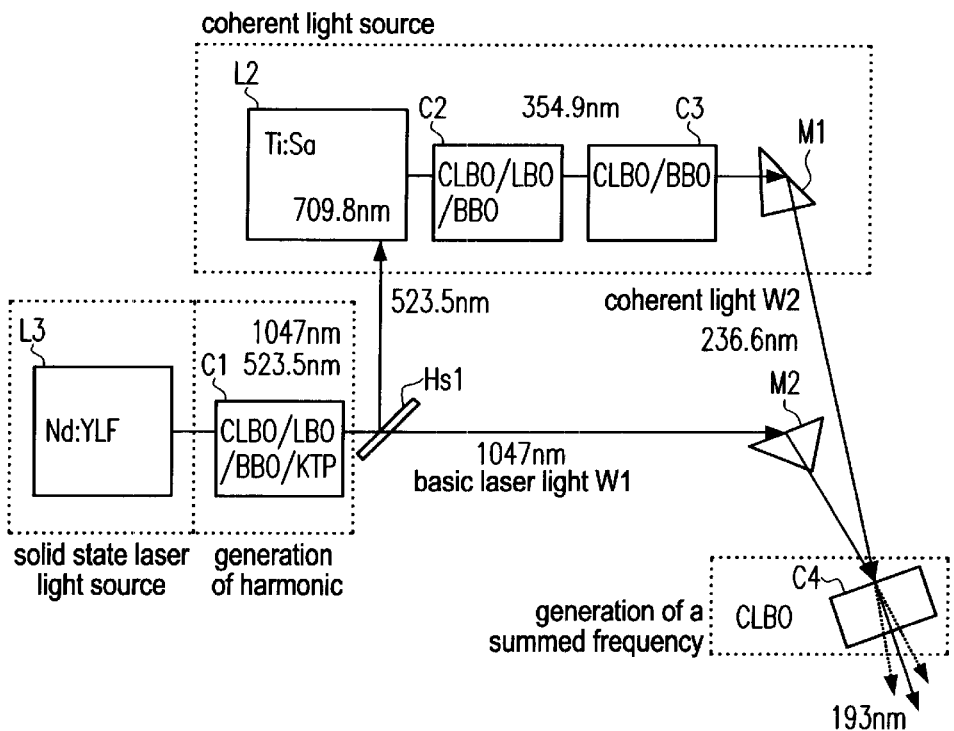

| | | Ti:Sa/OPO wavelength (nm) | Ti:Sa/OPO double waves (nm) | Ti:Sa/OPO triple waves (nm) | | solid state laser wavelength (YAG/YVO₄) (nm) | solid state laser double waves (nm) | summed frequency wavelength (nm) |
|---|---|---|---|---|---|---|---|---|
| ① | Xe | 708.215 | 354.11 | 236.07 | I₂ | 1064.492 | 532.2461 | 193.221 |
| ② | Kr | 707.397 | 353.70 | 235.80 | I₂ | 1064.492 | 532.2461 | 193.038 |
| ③ | He | 706.519 | 353.26 | 235.51 | I₂ | 1064.492 | 532.2461 | 192.842 |
| ④ | Ar | 710.750 | 355.38 | 236.92 | I₂ | 1064.492 | 532.2461 | 193.787 |
| ⑤ | Xe | 708.215 | 354.11 | 236.07 | Sm | 1064.122 | 532.061 | 193.209 |
| ⑥ | Kr | 707.397 | 353.70 | 235.80 | Sm | 1064.122 | 532.061 | 193.026 |
| ⑦ | He | 706.519 | 353.26 | 235.51 | Sm | 1064.122 | 532.061 | 192.830 |
| ⑧ | Ar | 710.750 | 355.38 | 236.92 | Sm | 1064.122 | 532.061 | 193.775 |

Fig.3(a)

[ ] Stabilization wavelength

| | | Ti:Sa/OPO wavelength (nm) | Ti:Sa/OPO double waves (nm) | Ti:Sa/OPO triple waves (nm) | | solid state laser wavelength (YLF) (nm) | summed frequency wavelength (nm) |
|---|---|---|---|---|---|---|---|
| ① | Xe | 711.960 | 355.980 | 237.320 | Ar | 1047.005 | 193.637 |
| ② | Ne | 713.940 | 356.970 | 237.980 | Ar | 1047.005 | 192.456 |
| ③ | Kr | 713.999 | 357.000 | 238.000 | Ar | 1047.005 | 192.261 |
| ④ | Ar | 710.750 | 355.375 | 236.917 | Ar | 1047.005 | 193.199 |

Fig.3(b)

Nd:YAG

| a | θ1 | θ2 | θooe |
|---|---|---|---|
| 0 | 76.1834 | 76.1834 | 76.1834 |
| 1.0000 | 76.0530 | 77.0530 | 76.2262 |
| 2.0000 | 76.0089 | 78.0089 | 76.3554 |
| 3.0000 | 76.0537 | 79.0537 | 76.5733 |
| 4.0000 | 76.1914 | 80.1914 | 76.8840 |
| 5.0000 | 76.4285 | 81.4285 | 77.2940 |
| 6.0000 | 76.7744 | 82.7744 | 77.8128 |
| 7.0000 | 77.2432 | 84.2432 | 78.4543 |
| 8.0000 | 77.8561 | 85.8561 | 79.2395 |
| 9.0000 | 78.6463 | 87.6463 | 80.2020 |
| 10.0000 | 79.6721 | 89.6721 | 81.3997 |
| 11.0000 | 81.0503 | 92.0503 | 82.9496 |
| 12.0000 | 83.1069 | 95.1069 | 85.1775 |
| 12.8183 | 87.7894 | 100.6077 | 90.0000 |

Nd:YAG

| a | θ1 | θ2 | θooe |
|---|---|---|---|
| 0 | 77.4184 | 77.4184 | 77.4184 |
| 1.0000 | 77.2896 | 78.2896 | 77.4658 |
| 2.0000 | 77.2567 | 79.2567 | 77.6092 |
| 3.0000 | 77.3230 | 80.3230 | 77.8516 |
| 4.0000 | 77.4943 | 81.4943 | 78.1989 |
| 5.0000 | 77.7798 | 82.7798 | 78.6603 |
| 6.0000 | 78.1936 | 84.1936 | 79.2499 |
| 7.0000 | 78.7575 | 85.7575 | 79.9894 |
| 8.0000 | 79.5071 | 87.5071 | 80.9145 |
| 9.0000 | 80.5060 | 89.5060 | 82.0885 |
| 10.0000 | 81.8889 | 91.8889 | 83.6463 |
| 11.0000 | 84.0797 | 95.0797 | 86.0118 |
| 11.6061 | 87.9163 | 99.5223 | 90.0000 |

| | Ti:Sa/OPO wavelength (nm) | wavelength (nm) of summed frequency by nonlinear crystal C7 | | solid state laser wavelength (YAG/YVO₄) (nm) | solid state laser double waves (nm) | wavelength (nm) of summed frequency by nonlinear crystal C4 |
|---|---|---|---|---|---|---|
| ① Xe | 708.215 | 236.393 | I₂ | 1064.492 | 532.2461 | 193.436 |
| ② Kr | 707.397 | 236.302 | I₂ | 1064.492 | 532.2461 | 193.375 |
| ③ He | 706.519 | 236.204 | I₂ | 1064.492 | 532.2461 | 193.310 |
| ④ Ar | 710.750 | 236.675 | I₂ | 1064.492 | 532.2461 | 193.625 |
| ⑤ Xe | 708.215 | 236.338 | Sm | 1064.122 | 532.061 | 193.387 |
| ⑥ Kr | 707.397 | 236.247 | Sm | 1064.122 | 532.061 | 193.326 |
| ⑦ He | 706.519 | 236.149 | Sm | 1064.122 | 532.061 | 193.261 |
| ⑧ Ar | 710.750 | 236.620 | Sm | 1064.122 | 532.061 | 193.576 |

Fig.19(a)

⬚ : Stabilization wavelength

| | Ti:Sa/OPO wavelength (nm) | wavelength (nm) of summed frequency by nonlinear crystal C7 | | solid state laser wavelength (YLF) (nm) | wavelength (nm) of summed frequency by nonlinear crystal C4 |
|---|---|---|---|---|---|
| ① Xe | 738.600 | 237.010 | Ar | 1047.005 | 193.262 |
| ② Ne | 743.890 | 237.552 | Ar | 1047.005 | 193.622 |
| ③ Kr | 740.702 | 237.226 | Ar | 1047.005 | 193.405 |
| ④ Ar | 738.398 | 236.989 | Ar | 1047.005 | 193.248 |

Fig.19(b)

| | | OPO emergence wavelength (nm)λ2 | seed wavelength (nm)λ1 | OPO double-wave (nm) | solid state laser wavelength (YAG/YVO₄) (nm) | | solid state laser double waves (nm) | summed frequency wavelength (nm) |
|---|---|---|---|---|---|---|---|---|
| ① | Sm | 472.842 | 1421.719 | 236.421 | I₂ | 1064.492 | 532.2461 | 193.455 |
| ② | Xe | 473.415 | 1416.564 | 236.708 | I₂ | 1064.492 | 532.2461 | 193.647 |
| ③ | Kr | 472.498 | 1424.838 | 236.249 | I₂ | 1064.492 | 532.2461 | 193.340 |
| ④ | Ar | 471.994 | 1429.441 | 235.997 | I₂ | 1064.492 | 532.2461 | 193.171 |
| ⑤ | Sm | 472.842 | 1421.740 | 236.421 | Sm | 1064.122 | 532.061 | 193.443 |
| ⑥ | Xe | 473.415 | 1416.599 | 236.708 | Sm | 1064.122 | 532.061 | 193.635 |
| ⑦ | Kr | 472.498 | 1424.850 | 236.249 | Sm | 1064.122 | 532.061 | 193.328 |
| ⑧ | Ar | 471.994 | 1429.440 | 235.997 | Sm | 1064.122 | 532.061 | 193.159 |

Fig.22(a)

: Stabilization wavelength

| | | OPO emergence wavelength (nm)λ2 | seed wavelength (nm)λ1 | OPO double-wave (nm) | solid state laser wavelength (YLF) (nm) | | summed frequency wavelength (nm) |
|---|---|---|---|---|---|---|---|
| ① | Sm | 738.600 | 1319.061 | 237.285 | Ar | 1047.005 | 193.444 |
| ② | Xe | 743.890 | 1316.028 | 237.479 | Ar | 1047.005 | 193.573 |
| ③ | Kr | 740.702 | 1324.212 | 236.950 | Ar | 1047.005 | 193.222 |
| ④ | Ar | 738.398 | 1326.631 | 236.796 | Ar | 1047.005 | 193.119 |

Fig.22(b)

LIGHT SOURCE

TECHNICAL FIELD

1. Field of the Invention

The invention relates to a light source device which is used for a semiconductor lithography device, surface activating, precision machining (perforation, cutting to size, grooving), perforation of a printed board, installation of nozzles in an inkjet printer, marking and the like. The invention relates especially to a light source device consisting of a solid state laser device which can be used as a replacement light source for an excimer laser.

2. Description of the Related Art

There has recently been a demand for an increase of image definition according to refinement of an integrated semiconductor circuit or the like. The wavelengths of the exposure source are therefore becoming shorter and shorter. An ArF excimer laser with a wavelength of 193 nm is regarded as definitive as a light source for semiconductor lithography for the coming generation.

It is therefore well known that a light source using the above described excimer laser has the following disadvantages:

(1) Since corrosive gas is used as a laser medium, the electrodes which form the main part of the laser, and the main parts such as a capacitor and the like, are often corroded and degraded. Therefore the cost for their maintenance is high.
(2) The laser gas is also soon degraded. Therefore the gas must be replaced upon each recording by 10°.
(3) There is a problem with respect to safety precautions since the corrosive gas leaks.
(4) The gas pipelines consist of stainless steel in order to preserve the laser power. The accessories therefore become expensive.

The inventors therefore have already proposed the above described light source device in which using a solid state laser device light with a wavelength of 193 nm is generated (JP-HEI 9-112346).

(a) Quintuple waves of the laser light which is emitted from a Nd—YLF laser light source are produced by means of a nonlinear optical crystal LBO, CLBO (the first coherent light beam has a wavelength of 209.4 nm).
Furthermore double waves of the laser light which is emitted by a Nd—YLF laser light source are produced by means of a nonlinear optical crystal LBO and a difference frequency between these double waves and the laser light which is emitted by a semiconductor laser light source is produced by means of a photoparametric oscillator (the second coherent light beam has a wavelength of 2532.814 nm). Light with a frequency (193.4 nm) formed by the sum of the first and the second coherent light beams is produced by means of the nonlinear optical crystal CLBO (first embodiment in JP-HEI 9-112346).

(b) Quintuple waves of the laser light which is emitted by a Nd—YAG laser light source are produced by means of a nonlinear optical crystal LBO, CLBO (the first coherent light beam has a wavelength of 212.824 nm).
Furthermore, double waves of the laser light which is emitted by a Nd—YAG laser light source are produced by means of a nonlinear optical crystal LBO and a difference frequency between these double waves and the laser light which is emitted by a semiconductor laser light source is produced by means of a photoparametric oscillator (the second coherent light beam has a wavelength of 2185.8206 nm). Light with a frequency (193.9 nm) formed by the sum of the first and the second coherent light beams is produced by means of the nonlinear optical crystal CLBO (second embodiment in JP-HEI 9-112346).

The light source device described above in (a) and (b) had the following defects:

(1) The disadvantage of phase mismatch of the nonlinear optical crystal CLBO (hereinafter called "CLBO crystal") in the generation of the frequency formed by the sum of the first and the second coherent light beams.
The CLBO crystal has the property of often producing hydrates. Here, as shown in FIG. 26, there is an absorption band in the wavelength range of greater than 1800 nm, i.e. in the vicinity of 2 microns.
In the above described (a) and (b) therefore absorption of the second coherent light beam becomes large (in (a) the light with a wavelength of 2532.814 nm and in (b) the light with a wavelength of 2185.8206 nm).
Therefore it is regarded as a disadvantage that heat is generated within the CLBO crystal, that due to the heat formed the phase matching angle deviates in the process of generation of the summed frequency, that therefore a phase mismatch state arises and that the efficiency of wavelength conversion into the light with the summed frequency decreases. The phase mismatch and phase matching can be taken for example from the Japanese patent application HEI 8-312478 already proposed by the inventors.
Furthermore, there is the disadvantage that absorption of the resulting light with a wavelength of 193 nm causes heating of the CLBO crystal, that therefore a phase mismatch state in the above described manner arises, and that the efficiency of wavelength conversion into the light with the summed frequency decreases.

(2) Disadvantage of phase mismatch of the CLBO crystal when the first coherent light beam is produced
In the second coherent light beam the basic waves from a Nd—YLF laser light source and a Nd—YAG laser light source are converted by a first nonlinear optical crystal into double waves, by a second nonlinear optical crystal into quadruple waves and by a third nonlinear optical crystal into quintuple waves.
Here the crystals which can be used in practice as the third nonlinear optical crystal which is used as the last stage for generating the quintuple waves are a CLBO crystal and a BBO crystal.
But for the two crystals it is considered a disadvantage that due to phase mismatch as a result of absorption (linear absorption or two-photon absorption) of the resulting quintuple waves essentially the efficiency of wavelength conversion into quintuple waves decreases.

As was described above, in the above described light source device it was considered disadvantageous that the nonlinear optical crystal in the generation of quintuple waves and of light with the summed frequency absorbs light and furthermore also fundamentally light with the summed frequency, that therefore the state of phase matching of the crystal changes, and that the efficiency of wavelength conversion drops (hereinafter the above described change of the state of phase matching of the crystal into the state of phase mismatch is called "heat induced phase mismatch").

The invention was devised to eliminate the defects of the above described conventional light source device. Therefore the object of the invention is to devise a replacement light source with a simple arrangement for an ArF excimer laser in which light with a wavelength of roughly 193 nm can be produced with high efficiency without reducing the efficiency of wavelength conversion, and in which thus the degradation of beam quality is only little.

DISCLOSURE OF THE INVENTION

The above described object is achieved as claimed in the invention as follows:

(1) A light source device which comprises:
   a solid state laser light source which produces basic laser light with a wavelength of greater than or equal to 1000 nm and less than or equal to 1800 nm;
   a means for producing a harmonic which produces a harmonic of the above described basic laser light;
   a coherent light source which is excited by the above described harmonic; and
   a means for producing a summed frequency which produces laser light with a summed frequency with a wavelength of roughly 193 nm from the basic laser light which is emitted from the above described solid state laser light source, and from the coherent light which is emitted from the above described coherent light source.

(2) A light source device which comprises:
   a first solid state laser light source which produces first basic laser light with a wavelength of greater than or equal to 1000 nm and less than or equal to 1800 nm;
   a second solid state laser light source which produces second basic laser light with a wavelength of greater than or equal to 1000 nm and less than or equal to 1800 nm;
   a means for producing a harmonic which produces a harmonic of the above described second basic laser light;
   a coherent light source which is excited by the above described harmonic;
   a means for producing a summed frequency which produces laser light with a summed frequency with a wavelength of roughly 193 nm from the first basic laser light which is emitted from the above described first solid state laser light source, and from the coherent light which is emitted from the above described coherent light source; and
   a timing circuit which controls the timing of the oscillation between the first solid state laser light source and the second solid state laser light source such that the first basic laser light and the coherent light are incident essentially at the same time on the means for producing a summed frequency.

(3) In (1) and (2) the angle between the basic laser light which is emitted from the solid state laser light source and the coherent light which is emitted from the coherent light source is fixed at greater than 0 degrees, the two types of light being incident on the means for producing a summed frequency.

(4) A light source device which comprises:
   a solid state laser light source which produces basic laser light with a wavelength of greater than or equal to 1000 nm and less than or equal to 1800 nm using a solid state crystal which is doped with neodymium ions;
   a first means for producing a harmonic which produces a harmonic of the basic laser light which is emitted from the solid state laser light source;
   a photoparametric oscillator which is excited by the above described harmonic;
   a second means for producing a harmonic which produces a harmonic of the laser light which is emitted from the above described photoparametric oscillator; and
   a CLBO crystal on which the basic laser light emitted from the solid state laser light source as well as the harmonic of the laser light of the photoparametric oscillator which is emitted by the second means for producing a harmonic are incident, and which produces light with a summed frequency with a wavelength of roughly 193 nm.

(5) A light source device which comprises:
   a first solid state laser light source which produces basic laser light with a wavelength of greater than or equal to 1000 nm and less than or equal to 1800 nm using a solid state crystal which is doped with neodymium ions;
   a second solid state laser light source,
   a first means for producing a harmonic which produces a harmonic of the basic laser light which is emitted from the above described second solid state laser light source;
   a titanium-sapphire laser light source which is excited by the above described harmonic;
   a second means for producing a harmonic which produces a harmonic of the laser light which is emitted from the above described titanium-sapphire laser light source;
   a CLBO crystal on which the basic laser light emitted from the first solid state laser light source as well as the harmonic of the laser light of the titanium-sapphire light source which is emitted by the second means for producing a harmonic are incident, and which produces light with a summed frequency with a wavelength of roughly 193 nm and
   a timing circuit which controls the timing of the oscillation between the first solid state laser light source and the second solid state laser light source such that the basic laser light from the first solid state laser light source and the harmonic of the laser light from the titanium-sapphire light source which is emitted from the second means for producing a harmonic coherent light are incident essentially at the same time on the CLBO crystal which produces the above described light with a summed frequency.

(6) A light source device which comprises:
   a solid state laser light source which produces basic laser light with a wavelength of greater than or equal to 1000 nm and less than or equal to 1800 nm;
   a means for producing a harmonic which produces a harmonic of the above described basic laser light;
   a coherent light source which is excited by the above described harmonic;
   a first means for producing a summed frequency which produces the first light with a summed frequency from the basic laser light which is emitted from the above described solid state laser light source, and from the coherent light which is emitted from the above described coherent light source; and
   a second means for producing a summed frequency which produces the second light with a summed frequency with a wavelength of roughly 193 nm from the basic laser light which is emitted from the above described solid state laser light source, and from the light with a summed frequency from the above described first means for producing a summed frequency.

(7) A light source device which comprises:
   a first solid state laser light source which produces the first basic laser light with a wavelength of greater than or equal to 1000 nm and less than or equal to 1800 nm;
   a second solid state laser light source which produces the second basic laser light with a wavelength of greater than or equal to 1000 nm and less than or equal to 1800 nm;

a means for producing a harmonic which produces a harmonic of the above described second basic laser light;

a coherent light source which is excited by the above described harmonic;

a first means for producing a summed frequency which produces the first light with a summed frequency from the first basic laser light which is emitted from the above described first solid state laser light source, and from the coherent light which is emitted from the above described coherent light source; and a second means for producing a summed frequency which produces the second light with a summed frequency with a wavelength of roughly 193 nm from the first basic laser light which is emitted from the above described first solid state laser light source, and from the light with a summed frequency from the above described first means for producing a summed frequency; and a timing circuit which controls the timing of the oscillation between the first solid state laser light source and the second solid state laser light source such that the first basic laser light and the coherent light which is emitted from the above described coherent light source are incident essentially at the same time on the first means for producing a summed frequency.

(8) In (4) and (5) the solid state laser light source is formed from a Nd—YVO$_4$ laser light source or a Nd—YAG laser light source or a Nd—YLF laser light source. The angle of incidence of the basic laser light incident on the CLBO crystal and of a third harmonic of the laser light of the above described photoparametric oscillator or the above described titanium-sapphire light source is selected such that the angle of reflection $\Theta ooe$ of the CLBO crystal as the means for producing a summed frequency with respect to its crystal axis lies in the following range:

$$77.4° \leq \Theta ooe \leq 90°$$

(9) In (1), (2), (3), (4), (5), (6), (7) and (8) there is a wavelength stabilization means which stabilizes the wavelengths of the light emitted from the coherent light source.

As was described above, as claimed in the invention a replacement light source for a ArF excimer laser can be obtained which has a simple arrangement and in which the degradation of the beam quality is only little. Furthermore the basic laser light emitted from the solid state laser light source can be introduced without attenuation into the means for producing a summed frequency. Thus it becomes possible to increase the conversion efficiency in the means for producing a summed frequency.

In addition, as claimed in the invention the light which is incident on the means for producing a summed frequency has longer wavelengths than the quintuple waves (wavelengths: 213 nm) of the light emitted from a Nd—YAG laser light source or quintuple waves (wavelength: 209.4 nm) of the light emitted from a Nd:YLF laser light source. Therefore the drop in conversion efficiency as a result of phase mismatch can be reduced compared to that in the prior art.

Since furthermore the wavelength of the basic laser light is greater than or equal to 1000 nm and less than or equal to 1800 nm, and since when using a CLBO crystal as the means for producing a summed frequency therefore the wavelength does not lie in the range of roughly 2 microns in which the absorption band of the CLBO crystal is present, the efficiency of wavelength conversion can be increased and the heat-induced phase mismatch can be made smaller by the means for producing a summed frequency than in the prior art.

In addition, by executing vector-phase matching the allowable width of the angle can be increased and the decrease of the conversion efficiency as a result of the heat-induced phase mismatch can be reduced.

BRIEF DESCRIPTION OF THE DRAWING

FIG. 1 shows a schematic (1) of the basic arrangement of a light source device as claimed in the invention using a titanium-sapphire laser light source;

FIG. 2 shows a schematic (2) of the basic arrangement of a light source device as claimed in the invention using a titanium-sapphire laser light source;

FIG. 3 shows a schematic of the spectral regions of the atoms which can be used for wavelength stabilization in the invention;

FIG. 19 shows a schematic of the spectral regions of the atoms of the light source device which can be used for wavelength stabilization, in which device a summed frequency is generated twice;

FIG. 22 shows a schematic of the spectral relationship of the atoms of the light source device which can be used for wavelength stabilization using an OPO oscillator (excitation by a third harmonic);

BEST MODE FOR CARRYING OUT THE INVENTION

Figure 4:
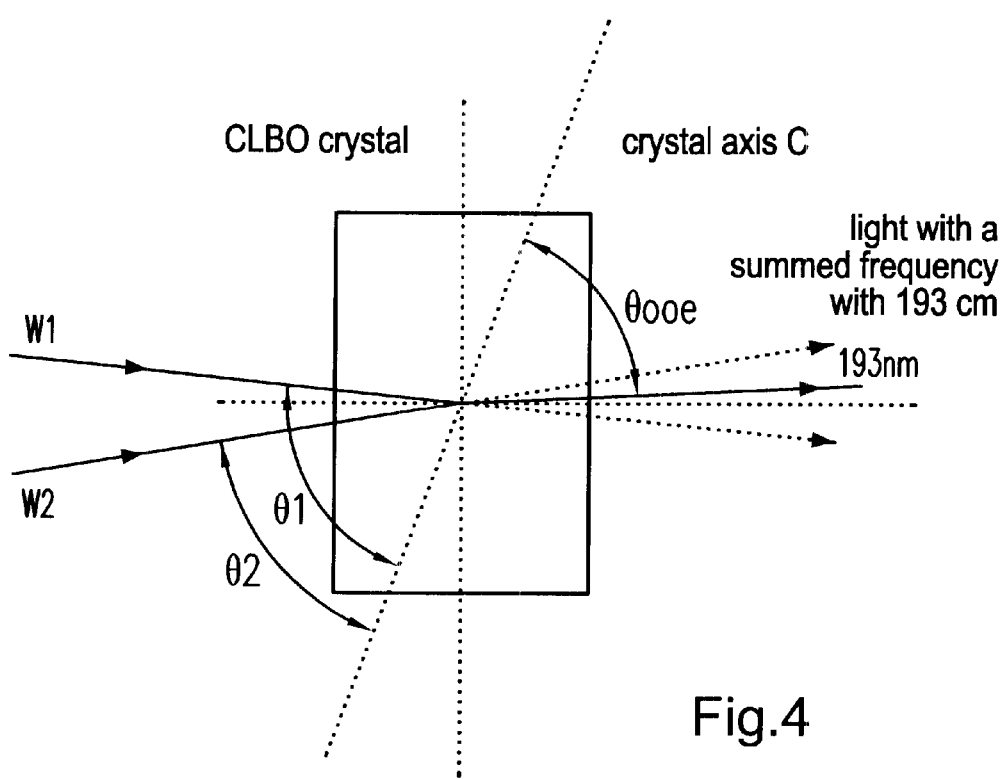
FIG. 4 shows a schematic of the relation between the angle of incidence and the angle of reflection in the case in which two beams are incident on the CLBO crystal.

In the following the invention is further described using several embodiments.

(1) Light source device using a titanium-sapphire laser light source (a) Basic arrangement FIGS. 1 and 2 each show schematically the basic arrangement of a light source device using a titanium-sapphire laser light source. FIG. 1(a) and FIG. 2(a) each show an arrangement in which two beams from the same direction are allowed to be incident on a CLBO crystal and light with a summed frequency is obtained, i.e. light with a wavelength of 193 nm. FIG. 1(b) and FIG. 2(b) each show an arrangement in which two beams from different directions are allowed to be incident on a CLBO crystal in order to achieve vector-phase matching. In doing so light with a summed frequency with a wavelength of roughly 193 nm is obtained which is hereinafter called "light with a summed frequency with 193 nm".

FIG. 1 shows the arrangement when using a Nd:YAG laser as the light source which emits basic laser light W1, while FIG. 2 shows the arrangement when using a Nd:YLF laser light source.

In FIGS. 1 and 2 cases are described in which a Nd:YAG laser light source which oscillates at 1064 nm and a Nd:YLF laser light source which oscillates at 1047 nm are used. However a Nd:YLF laser light source which oscillates at 1053 nm, a YVO$_4$ laser light source which oscillates at 1064 nm or a Yb:YAG laser light source which oscillates at roughly 1032 nm can also be used.

In FIG. 1(a) the light with a summed frequency with 193 nm is obtained as follows.

(1) The basic laser light W1 (wavelength: 1064 nm) which is emitted from a Nd:YAG laser light source L1 is allowed to be incident on a nonlinear optical crystal C1 (CLBO crystal, LBO crystal, KTP crystal or BBO crystal) and thus a second harmonic is produced (wavelength: 532 nm).

(2) After separation of the basic laser light W1 which is emitted from the nonlinear optical crystal C1 and its second harmonic by means of a harmonic separator Hs1 the basic laser light W1 is introduced via a dichroic mirror DM1 into a nonlinear optical crystal C4 for producing a summed frequency (a CLBO crystal).

(3) The second harmonic separated by the harmonic separator Hs1 is used as excitation light and thus a titanium-sapphire (Ti:Al$_2$O$_3$) laser light source L2 is oscillated (oscillation wavelength: 707.3 nm).

(4) The laser light emitted from the titanium-sapphire laser light source L2 is allowed to be incident on a nonlinear optical crystal C2 (a CLBO crystal, a LBO crystal, a KTP crystal or a BBO crystal), by which a second harmonic (wavelength: 353.7 nm) is obtained.

(5) The light emitted from the nonlinear optical crystal C2 with wavelengths of 707.3 nm and 353.7 nm is allowed to be incident on a nonlinear optical crystal C3 (a CLBO crystal or a BBO crystal), by which a third harmonic (wavelength: 235.8 nm) is obtained.

(6) From the nonlinear optical crystal C3 coherent light W2 is obtained which is introduced into a nonlinear optical crystal C4 for producing a summed frequency (a CLBO crystal) via a mirror M1 and a dichroic mirror DM1.

(7) From the above described basic laser light W1 (wavelength: 1064 nm) and the above described coherent light W2 (wavelength: 235.8 nm) the nonlinear optical crystal C4 for producing a summed frequency (CLBO crystal) produces light with a summed frequency with 193 nm.

Light with wavelengths of 1064 nm and 235.8 nm is emitted from the nonlinear optical crystal C4 for producing a summed frequency. However only light with 193 nm is removed using the harmonic separator, as is described below.

FIG. 2(a) shows a case of using the Nd:YLF laser light source. The light with 193 nm is obtained in the manner described below, i.e. in the same way as shown in FIG. 1(a):

(1) The basic laser light W1 (wavelength: 1047 nm) which is emitted from a Nd:YLF laser light source L3 is allowed to be incident on a nonlinear optical crystal C1 (CLBO crystal, LBO crystal, KTP crystal or BBO crystal) and thus a second harmonic is produced (wavelength: 523.5 nm).

(2) After separation of the basic laser light W1 and its second harmonic by means of the harmonic separator Hs1 the basic laser light W1 is introduced via a dichroic mirror DM1 into a nonlinear optical crystal C4 for producing a summed frequency (a CLBO crystal).

(3) The second harmonic (523.5 nm) separated by the harmonic separator Hs1 excites the titanium-sapphire laser light source L2. A second harmonic (wavelength: 354.9 nm) and a third harmonic (wavelength: 236.6 nm) are obtained from the laser light (oscillation wavelength: 709.8 nm) which is emitted from the titanium-sapphire laser light source L2 in the manner described in FIG. 1(a) by means of the nonlinear optical crystal C2 and by means of the nonlinear optical crystal C3.

(4) The coherent light W2 obtained by the nonlinear optical crystal C3 is introduced via a mirror M1 and a dichroic mirror DM1 is introduced into a nonlinear optical crystal C4 for producing a summed frequency (a CLBO crystal). Light with a summed frequency with 193 nm is produced from the above described basic laser light W1 (wavelength: 1047 nm) and the above described coherent light W2 (wavelength: 236.6 nm).

The wavelengths of the light which is emitted from the Nd:YAG laser light source L1, the Nd:YLF laser light source L3 and the titanium-sapphire laser light source L2 can be stabilized using the line spectral regions of the atoms with spectra which are essentially the equal to the desired wavelengths and using the absorption spectral regions of molecules.

FIG. 3 schematically shows spectral regions of the atoms which can be used for stabilization of wavelengths of the Nd:YAG laser light source L1, the Nd:YLF laser light source L3 and the titanium-sapphire laser light source L2. The wavelengths can likewise be stabilized by the spectral regions of the atoms shown in FIG. 3($a$) also in the case in which instead of the Nd:YAG laser light source L1 a Nd:YVO$_4$ laser light source is used. Furthermore, wavelength stabilization by the spectral regions of the atoms shown in FIG. 3 is also possible in the case in which instead of the titanium-sapphire laser light source L2 an OPO (abbreviation of "optical parametric oscillation": hereinafter only "OPO oscillator") is used, as is described below.

As FIG. 3($a$) shows, the titanium-sapphire laser light source L2 undergoes wavelength stabilization using the absorption spectra of xenon (Xe), krypton (Kr), helium (He) and argon (Ar).

Light with a wavelength of 193 nm can be obtained by stabilization of the Nd:YAG/Nd:YVO$_4$ laser light source L1 using the absorption spectra of iodine molecules (I$_2$) or samarium (Sm).

Furthermore, as is shown in FIG. 3($b$), light with a wavelength of 193 nm can be obtained by wavelength stabilization of the titanium-sapphire laser light source L2 using the spectra of xenon (Xe), neon (Ne), krypton (Kr), and argon (Ar) and by stabilization of the Nd:YLF laser light source L3 using the absorption spectra of argon (Ar).

For example, in the case in which the wavelength of the titanium-sapphire laser light source L2 using the spectrum of xenon (Xe) is stabilized at 708.215 nm, light with a wavelength of 354.1 1 nm is obtained as its double waves (second harmonic) and light with a wavelength of 236.07 nm is obtained as its triple waves (third harmonic).

On the other hand, there are the absorption spectra of iodine (I$_2$) molecules (wavelength: 532.2461 nm) as the absorption spectra of molecules with wavelengths which are essentially equal to the second harmonic of the basic laser light W1 which is emitted by the Nd:YAG laser/Nd:YVO$_4$ light source L1. Light with 1064.4922 nm is obtained by stabilization of the wavelength of the Nd:YAG/Nd:YVO$_4$ laser light source with the use thereof as the basic laser light W1.

Light with 193.221 nm as shown in FIG. 3 is obtained from light with a wavelength of 236.07 nm and light with a wavelength of 1064.4922 nm which has been stabilized by the above described means for light stabilization as light with a summed frequency (FIG. 31).

Likewise, in the case in which using the spectrum of krypton (Kr) the wavelength of the titanium-sapphire laser light source L2 is stabilized at 707.397 nm, light with a wavelength of 353.70 nm is obtained as its double waves (second harmonic) and light with a wavelength of 235.80 nm is obtained as its triple waves (third harmonic). Light with 193.038 nm as shown in FIG. 3 can be obtained as light with a summed frequency with the above described basic laser light W1 with 1064.4922 nm (FIG. 32).

As is described below, by stabilizing the wavelength of the titanium-sapphire laser light source L2 using the spectra of helium (He) and argon (Ar) light with 192.842 nm and with 193.787 nm is obtained as light with a summed frequency (FIG. 3 3,4).

Furthermore, by stabilizing the wavelength of the Nd:YAG laser/Nd:YVO$_4$ light source L1 using the absorption spectrum of samarium (Sm), light with 193 nm is obtained (FIG. 3($a$) 5 to 8).

On the other hand, there is the spectrum of neutral argon (wavelength: 1047.005 nm, hereinafter called "ArI spectrum") as the line spectrum of the atoms with wavelengths which are essentially equal to the basic laser light W1 which is emitted by the Nd:YLF laser light source L3. Light with a wavelength of 1047.005 nm is obtained by stabilization of the wavelength of the Nd:YLF laser light source L3 using the above described spectrum as the basic laser light W1, as is shown in FIG. 3($b$).

As was described above, by stabilization of the wavelength of the titanium-sapphire laser light source L2 using the spectrum of xenon (Xe), light with 236.07 nm can be obtained as its triple waves (third harmonic). Therefore light with 192.637 nm can be obtained as light with a summed frequency by using the above described basic laser light W1 with a wavelength of 1047.005 nm.

Likewise, by stabilizing the wavelength of the titanium-sapphire laser light source L2 using the spectra of neon (Ne), krypton (Kr) and argon (Ar), light with 192.456 nm, 192.261 nm and 193.199 nm can be obtained as light with a summed frequency, as illustrated in FIG. 3.

As shown in FIG. 1($a$) and FIG. 2($a$), simple arrangements can be obtained because between the solid state laser light sources L1, L2 and the nonlinear optical crystal C4) (CLBO crystal) which produces light with a summed frequency, nonlinear optical crystals are present only to a small extent. The degradation of the beam quality (distortion of the wave front) upon passage through the nonlinear optical crystal is also low.

Furthermore the light emitted by the solid state laser light sources L1, L2 can be introduced without attenuation into the nonlinear optical crystal C4 (CLBO crystal). In this way, an increase in the conversion efficiency in the nonlinear optical crystal C4 (CLBO crystal) is enabled and light with a summed frequency with a wavelength of 193 nm can be produced with high efficiency.

The light incident on the nonlinear optical crystal C4 (CLBO crystal) consists of light with a wavelength of roughly 236 nm, light with a wavelength of roughly 1064 nm, and light with a wavelength of roughly 1047 nm. Light W2 with a wavelength of roughly 236 nm has longer wavelengths than the quintuple waves of the light emitted by the Nd:YAG laser light source (wavelength: 212.824 nm) which is used in the above described Japanese patent application HEI 9-112346, and as the quintuple waves of the light emitted from the Nd:YLF laser light source (wavelength: 209.4 nm).

It is reported that in this wavelength range the heat-induced phase mismatch become greater and the wavelength conversion efficiency decreases more, the shorter the wavelengths become. By using light W2 with a wavelength of roughly 236 nm the reduction of the conversion efficiency as a result of phase mismatch can be decreased compared to the prior art (Japanese patent application HEI 9-112346).

Figure 15:
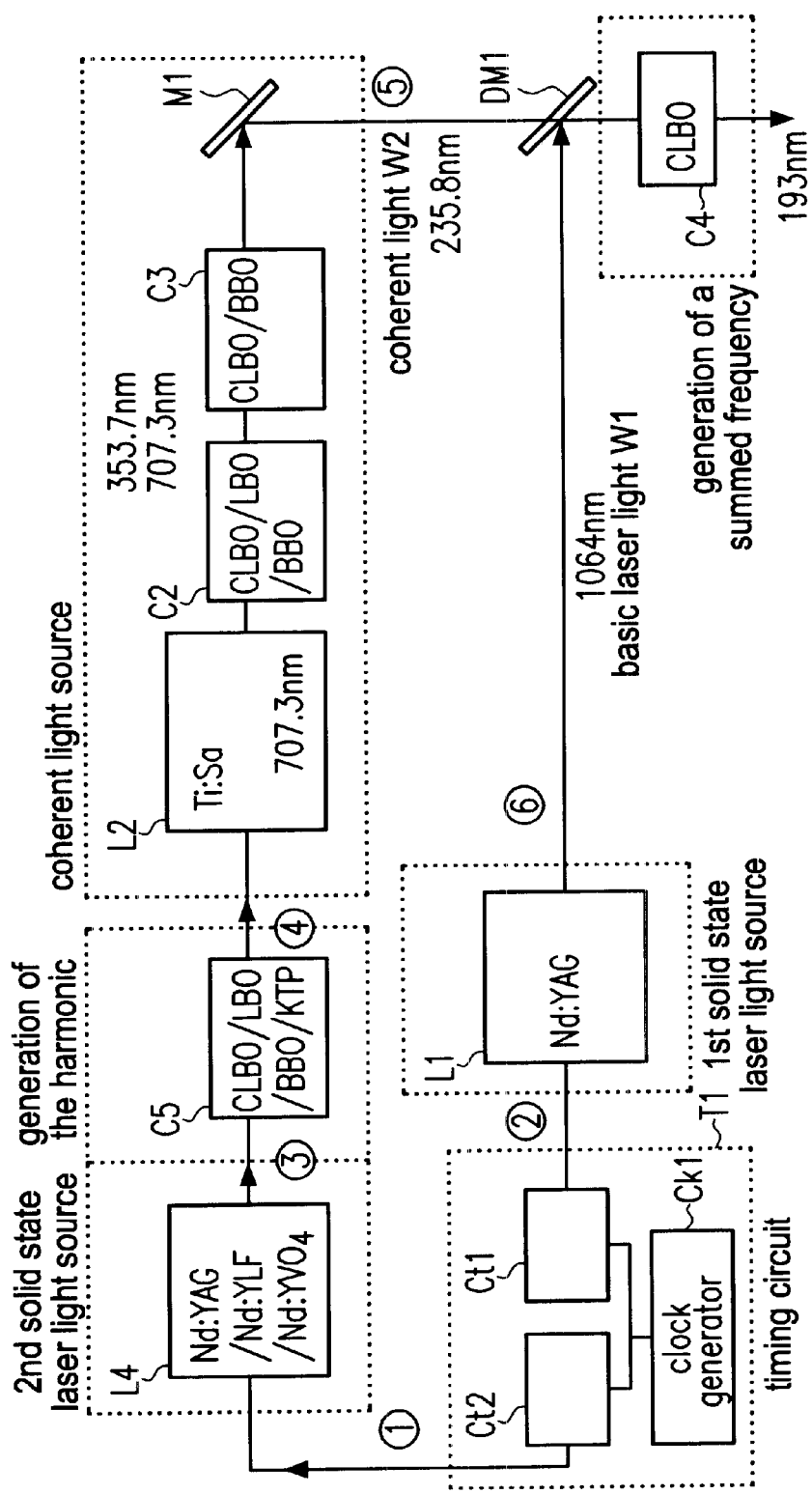
FIG. 15 shows a schematic of one example of the arrangement of a light source device which is provided with a timing circuit.

The other light W1 has wavelengths of 1064 nm and 1047 nm which do not lie in the wavelength range around 2 microns (as shown in FIG. 15 in the above described publication) in which the absorption band is present. They are therefore not absorbed by the nonlinear optical crystal C4 (CLBO crystal).

That is, by the arrangements shown in FIG. 1(a) and FIG. 2(a) the heat-induced phase mismatch can be reduced by the nonlinear optical crystal C4 (CLBO crystal) compared to that in the prior art and the wavelength conversion efficiency can be increased.

FIG. 1(b) and FIG. 2(b) each show an arrangement in which two beams W1 and W2 from different directions are allowed to be incident on the nonlinear optical crystal C4 (CLBO crystal) in order to achieve vector-phase matching.

In FIG. 1(b) and FIG. 2(b) the arrangements up to generating the basic laser light W1 with wavelengths of 1064 nm and 1047 nm and the coherent light W2 with a wavelength of roughly 236 nm are identical to the arrangements in FIG. 1(a) and FIG. 2(a). In FIG. 1(b) and FIG. 2(b) the basic laser light W1 and the coherent light W2 are allowed to be incident via a mirror M2 and a mirror M3 from different directions on the nonlinear optical crystal C4 (CLBO crystal).

In the following the relation between the angle of incidence on the nonlinear optical crystal C4 (CLBO crystal) and phase matching is described.

FIG. 4 is a schematic of the relation between the angle of incidence and the angle of reflection (angle of the CLBO crystal with respect to the crystal axis) in the case in which the two beams W1 and W2 are incident from different directions in the CLBO crystal. In the figure the refraction of the light when it is incident on the crystal and the refraction of the light when it is reflected from the crystal are not shown in order to simplify the description. The angle of incidence and the angle of reflection in the drawing correspond to the interior angles of the crystal.

In the drawings reference numbers W1 and W2 label the beams incident on the CLBO crystal, reference letter C labels the direction of the crystal axis of the CLBO crystal and reference number W3 labels light with a summed frequency with 193 nm which emerges from the CLBO crystal.

As is shown in the drawings, the light with a summed frequency emerges from the light W1 and the light W2 with an angle $\Theta ooe$ (hereinafter called the "phase matching angle") with reference to the crystal axis C when the two beams W1 and W2 are incident with angles $\Theta 1$ and $\Theta 2$ with reference to the crystal axis.

The relation between $\Theta 1$, $\Theta 2$, and $\Theta ooe$ is studied for which phase matching is obtained, by which the relations shown in FIGS. 5 and 6 were obtained.

Figures 5A, 5B:
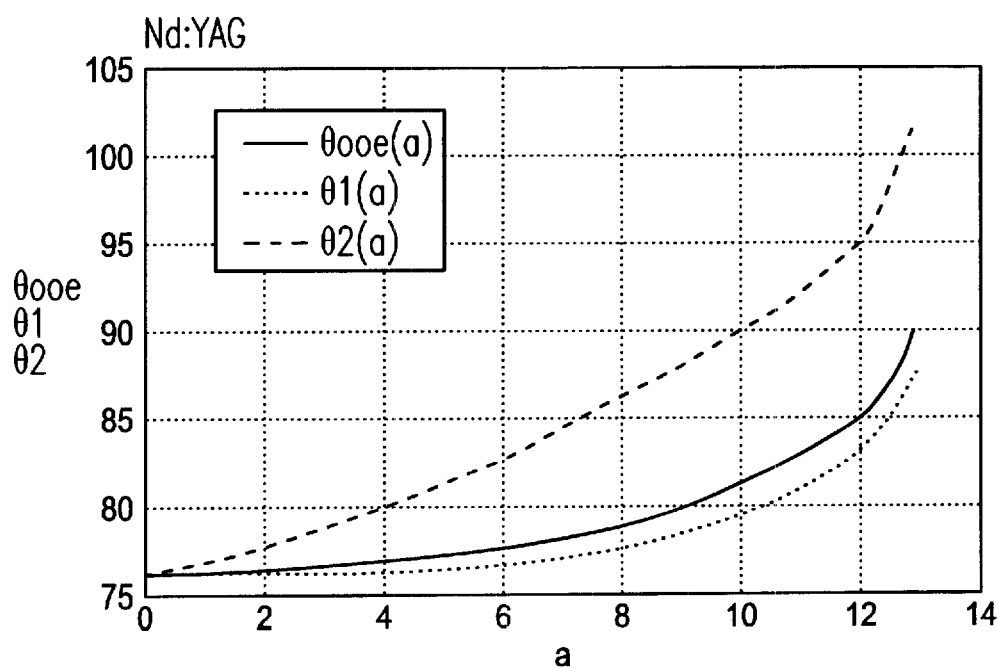
FIG. 5 shows a schematic of the relation between angles $\Theta 1$, $\Theta 2$ and $\Theta ooe$ at which phase matching is obtained (in the case of using a Nd:YAG laser light source)
Figures 6A, 6B:
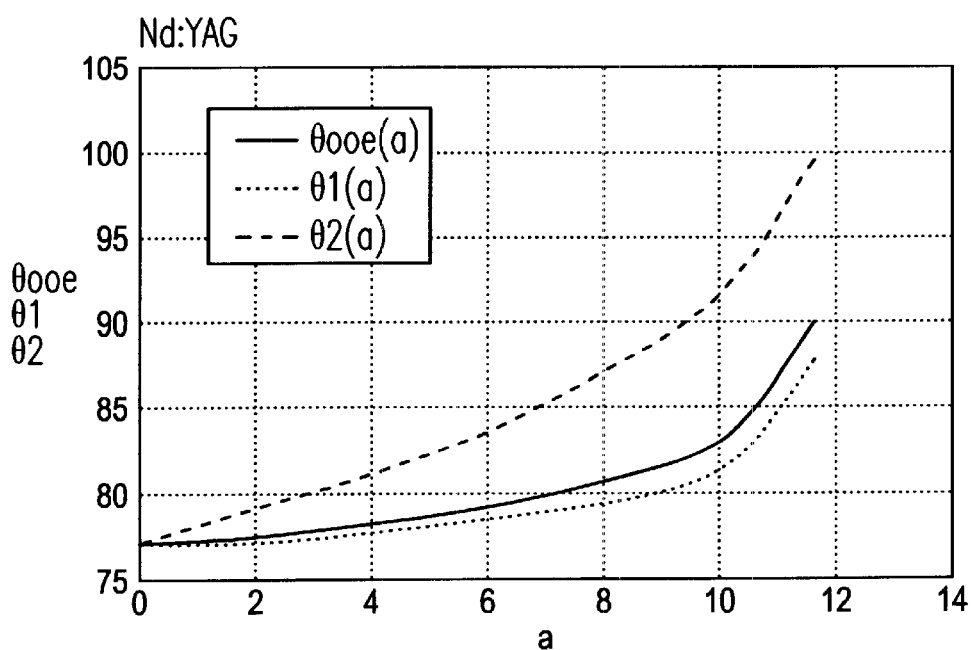
FIG. 6 shows a schematic of the relation between angles $\Theta 1$, $\Theta 2$ and $\Theta ooe$ at which phase matching is obtained (in the case of using a Nd:YLF laser light source)

FIG. 5 schematically shows a case of incidence of the light with wavelengths of 1064 nm and 235.8 nm (a case of using the Nd:YAG laser light source). FIG. 6 schematically shows a case of incidence of the light with wavelengths of 1047 nm and 236.6 nm (a case of using the Nd:YLF laser light source). FIG. 5(a) and FIG. 6(a) each show in table form the relation between the angle difference a between $\Theta 1$ and $\Theta 2$, $\Theta 1$, $\Theta 2$ and $\Theta ooe$. FIG. 5(b) and FIG. 6(b) each show the above described relation using a graphic representation, the x-axis plotting a and the y-axis plotting $\Theta 1$, $\Theta 2$ and $\Theta ooe$.

If for example in FIG. 5 the two beams are incident with 76.1834° with respect to the crystal axis C (in the same direction), light with a summed frequency emerges with an angle of 76.1834° with respect to the crystal axis C, i.e. in the same direction as the incident beams (in the case described above as shown in FIG. 1(a)). Furthermore the phase matching angle $\Theta ooe$ is 90° when $\Theta 1$ is 87.7894° and $\Theta 2$ is 100.6077° (the angle difference a=12.8183°). When the angles $\Theta 1$ and $\Theta 2$ exceed these values, phase mismatch occurs and light with a summed frequency cannot be obtained.

If in FIG. 6 the two beams are likewise incident with 77.4184° with respect to the crystal axis C, light with a summed frequency emerges with an angle of 77.4184° with respect to the crystal axis C (in the case described above as shown in FIG. 2(a)). Furthermore the phase matching angle $\Theta ooe$ is 90° when $\Theta 1$ is 87.9163° and $\Theta 2$ is 99.5223° (the angle difference a=11.6061°).

Next the relation between the above described angle difference a of the incident light and the allowable width of the angle at which phase matching can be obtained was studied.

Figure 7:
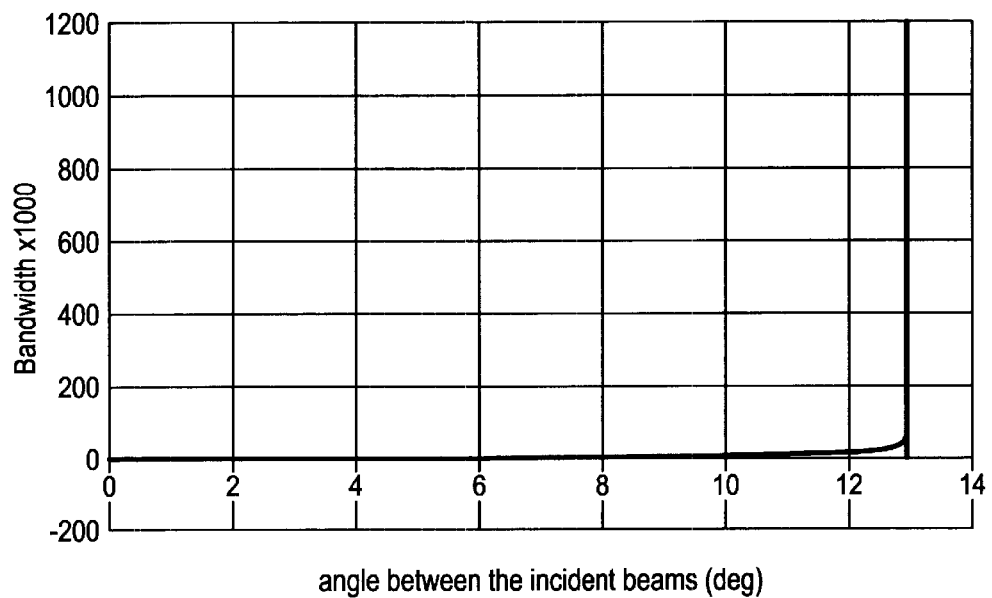
FIG. 7 shows a schematic (1) of the relation between the angle difference a and the allowable width of the angle of the incident light in the case of using a Nd:YAG laser light source.
Figure 8:
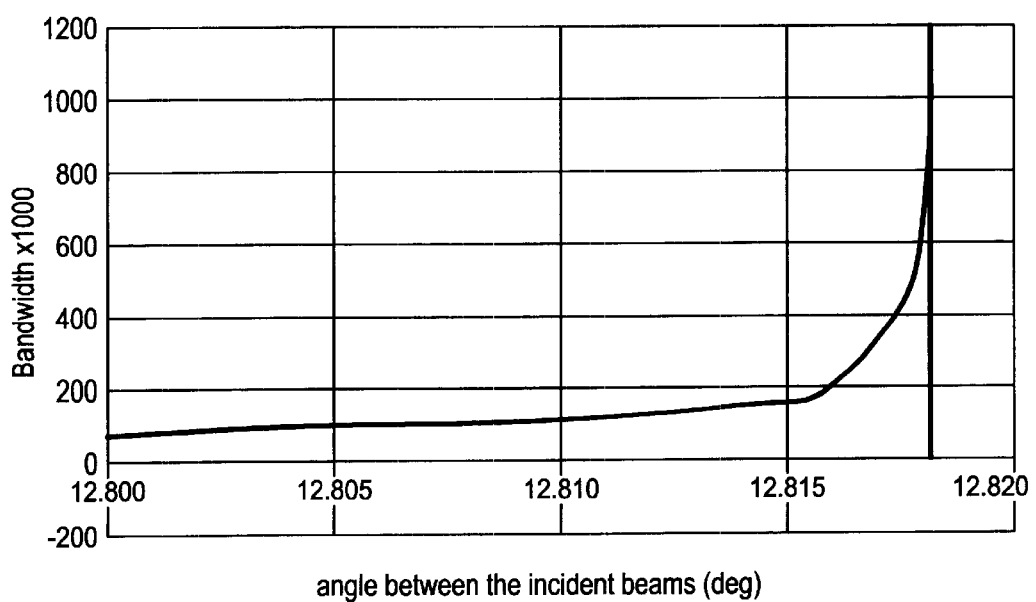
FIG. 8 shows a schematic (2) of the relation between the angle difference a and the allowable width of the angle of the incident light in the case of using a Nd:YAG laser light source.
Figure 9:
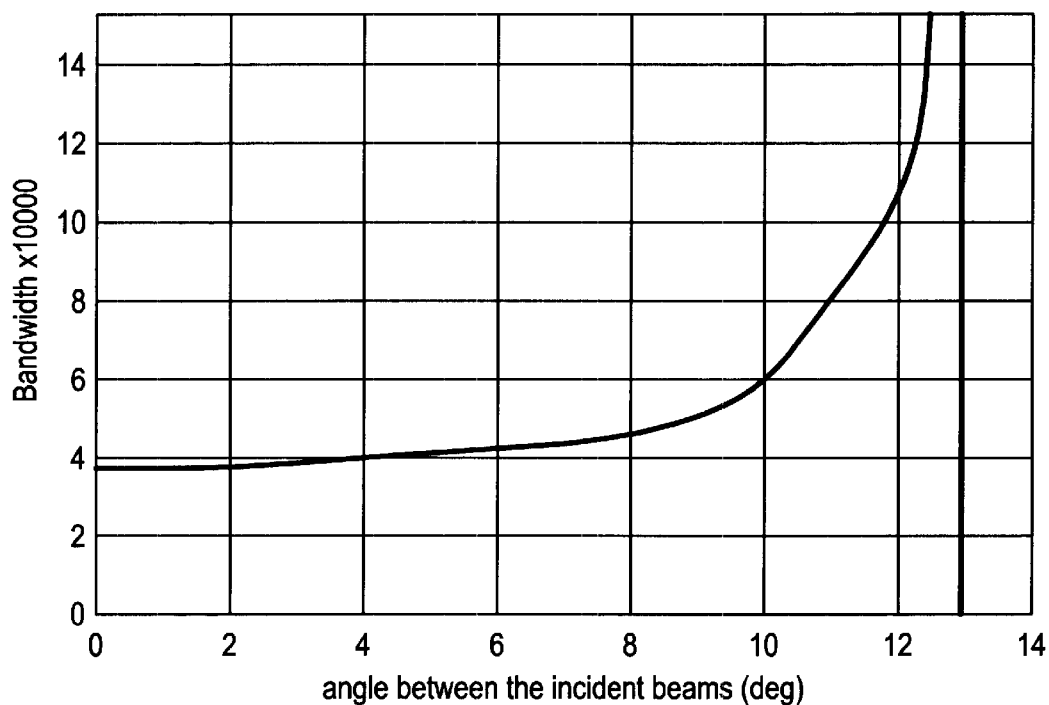
FIG. 9 shows a schematic (3) of the relation between the angle difference a and the allowable width of the angle of the incident light in the case of using a Nd:YAG laser light source.

FIG. 7 through FIG. 9 each show the relation between the angle difference a of the incident beams in the case of wavelengths of 1064 nm and 235.8 nm of the incident beams (in the case of using a Nd:YAG laser light source) (x-axis) and the allowable width of the angle (y-axis). FIG. 7 shows the allowable width of the angle at an angle difference a of 0° to 14°. FIG. 8 shows the allowable width of the angle at an angle difference a of roughly 12°. FIG. 9 is a graph of the y-axis as shown in FIG. 7 in an enlargement.

Figure 10:
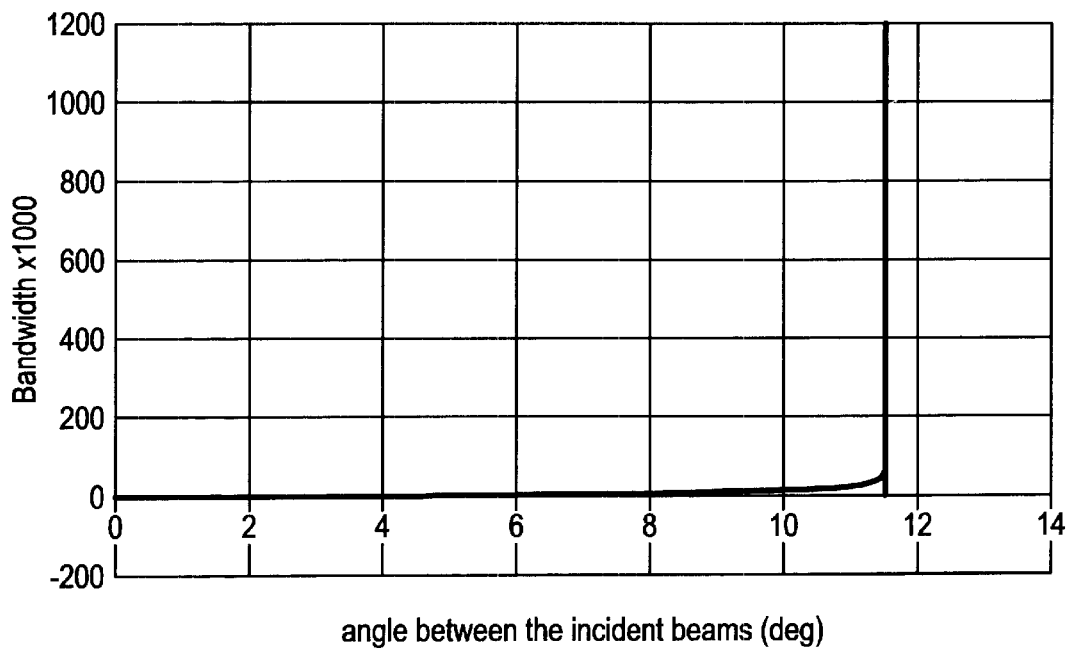
FIG. 10 shows a schematic (1) of the relation between the angle difference a and the allowable width of the angle of the incident light in the case of using a Nd:YLF laser light source.
Figure 11:
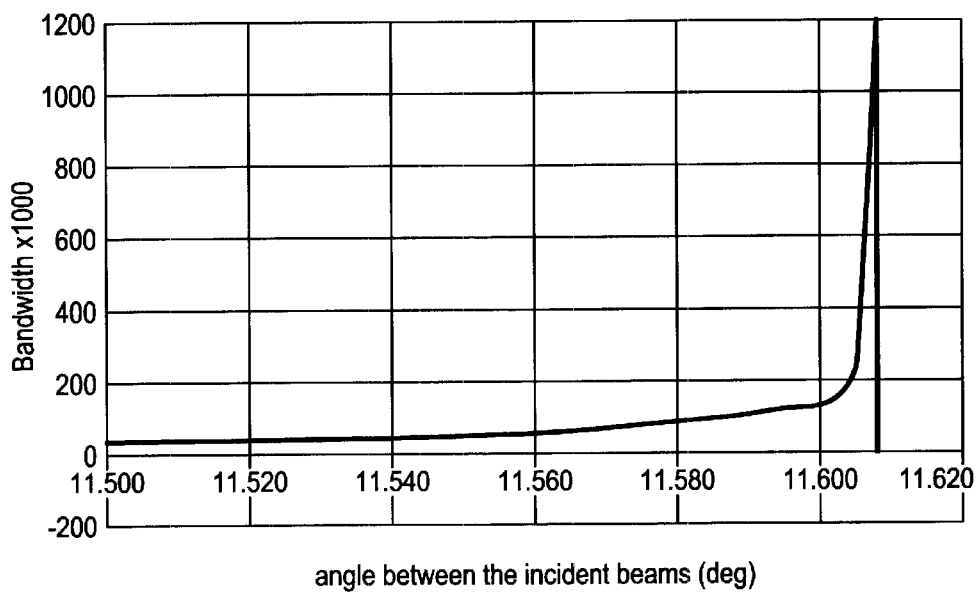
FIG. 11 shows a schematic (2) of the relation between the angle difference a and the allowable width of the angle of the incident light in the case of using a Nd:YLF laser light source.
Figure 12:
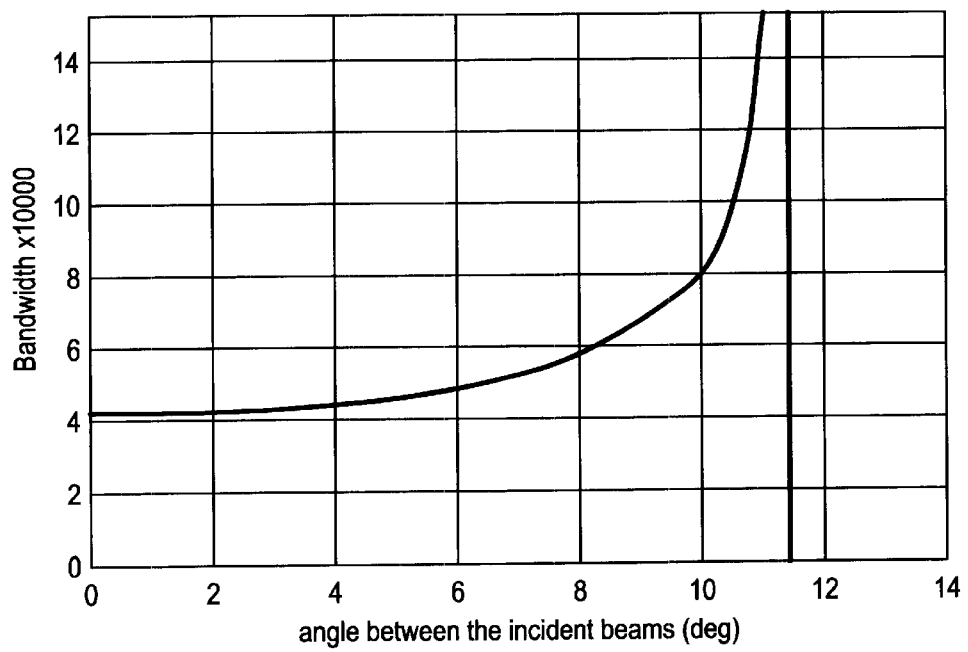
FIG. 12 shows a schematic (3) of the relation between the angle difference a and the allowable width of the angle of the incident light in the case of using a Nd:YLF laser light source.

FIGS. 10 to 12 each show the relation between the angle difference a of the incident beams in the case of wavelengths of 1047 nm and 236.6 nm of the incident beams (in the case of using a Nd:YLF laser light source) (x-axis) and the allowable width of the angle (y-axis). FIG. 10 shows the allowable width of the angle at an angle difference a of 0° to 14°. FIG. 11 shows the allowable width of the angle at an angle difference a of roughly 12°. FIG. 12 is a graph of the y-axis as shown in FIG. 10 in an enlargement.

As FIGS. 7 to 12 show, the allowable width of the angle increases until it becomes at least three times as large as in coaxial matching (a=0), the more the angle differences a of the incident beams approach 12.8183° or 11.6061° and the phase matching angle $\Theta ooe$ 90°.

That the allowable width of the angle is greater than in coaxial matching means that the drop of intensity of the light with a summed frequency occurs less often than in coaxial matching, even if the phase matching angle deviates as a result of a temperature increase of the CLBO crystal. By executing the above described vector phase matching the drop of the conversion efficiency as a result of the heat-induced phase mismatch can be reduced.

As shown in FIG. 1(b) and FIG. 2(b), simple arrangements can be obtained like those according to FIG. 1(a) and FIG. 2(a) and degradation of the beam quality can be reduced. Furthermore the heat-induced phase mismatch in the nonlinear optical crystal C4 (CLBO crystal) can be reduced even more that those according to FIG. 1(a) and FIG. 2(a). In addition the conversion efficiency can be increased. (b) Examples of specific arrangements of the light source devices shown in FIG. 1 and FIG. 2.

In the following, examples of specific arrangements are shown in which the light source devices shown in FIG. 1 and FIG. 2 are provided with means for wavelength stabilization. In the following, examples of the arrangements of the light source devices shown in FIG. 1(a) and FIG. 2(b) using the YAG laser light source and the YLF laser light source are described. However in the case of using a Nd:YLF laser light source which oscillates at 1053 nm, a YVO$_4$ laser light source which oscillates at 1064 nm, and a Yb:YAG laser light source which oscillates at 1032 nm, the same thing can be achieved by the means for wavelength stabilization shown in FIG. 3 or the like being used and thus wavelength stabilization being done, as was described above.

Figure 13:
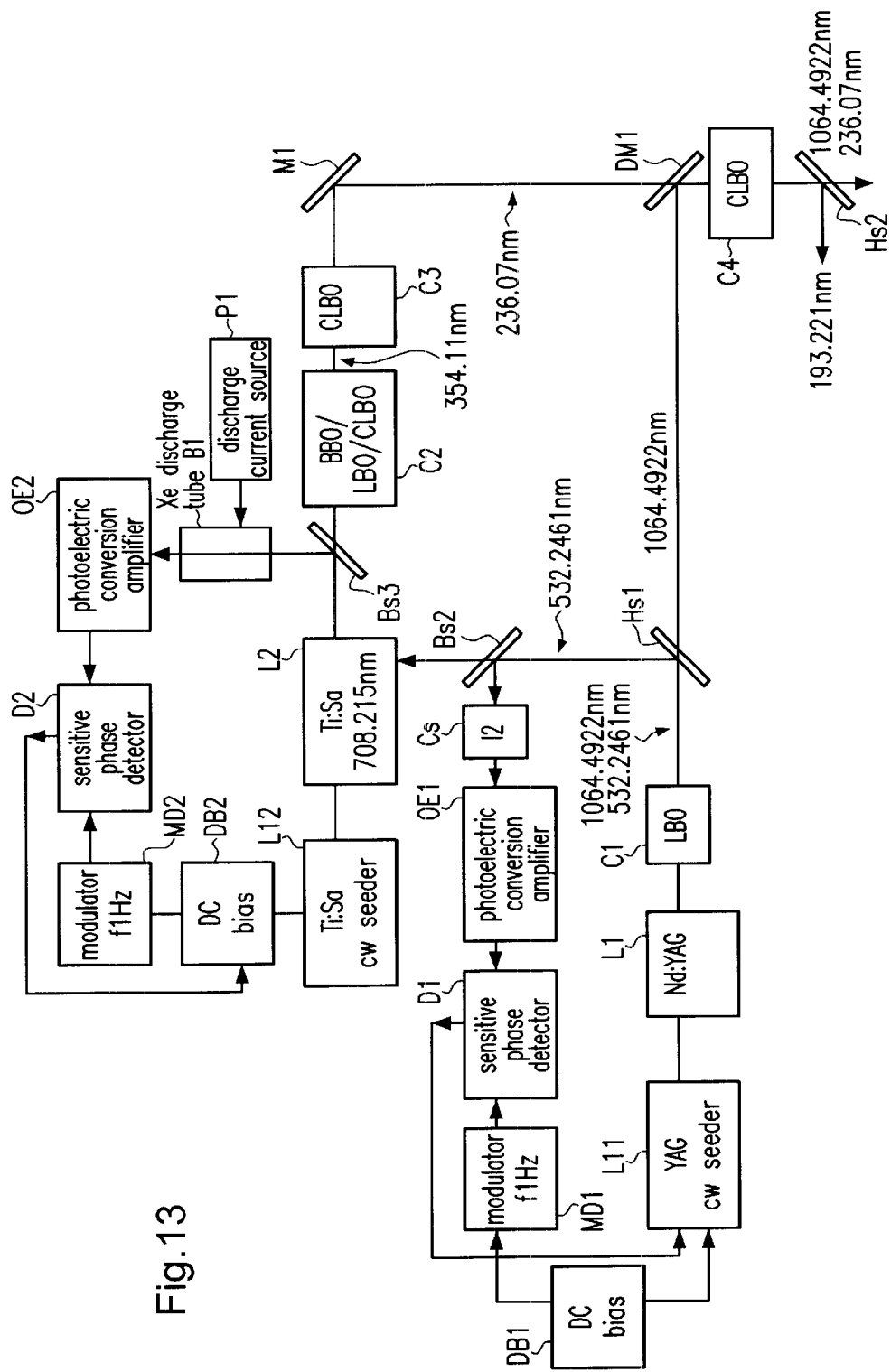
FIG. 13 shows a schematic of one example of the specific arrangement of the light source device shown in FIG. 1(a)

FIG. 13 shows one example of the specific arrangement of the light source device shown in FIG. 1(a). Here a Nd:YAG laser is used as the solid state laser light source and light with a summed frequency with a wavelength of 193 nm is obtained by coaxial matching.

In FIG. 13 the light with a summed frequency with a wavelength of 193 nm is obtained as follows:

(1) Generation of basic laser light W1

The wavelength of the Nd:YAG laser light source L1 is fixed by a YAG cw seeder L11. The Nd:YAG laser light source L1 thus emits the basic laser light W1. The light emitted from the Nd:YAG laser light source L1 is incident on the nonlinear optical crystal C1 (BBO crystal, LBO crystal, KTP crystal or CLBO crystal). The nonlinear optical crystal C1 emits the basic laser light with a wavelength of 1064 nm and as its second harmonic light with a wavelength of 532 nm.

After separation of the basic laser light W1 which is emitted from the LBO crystal C1 and its second harmonic by means of a harmonic separator Hs1 the basic laser light W1 is introduced via a dichroic mirror DM1 into a nonlinear optical crystal C4 for producing a summed frequency (a CLBO crystal).

The light separated by the harmonic separator Hs1 with a wavelength of 532 nm is sent via a beam sampler Bs2 of an iodine ($I_2$) cell Cs and at the same time is sent as excitation light to the titanium-sapphire laser light source L2.

When the light passes through the iodine ($I_2$) cell Cs, the $I_2$ molecules in the iodine ($I_2$) cell Cs absorb the passing light. The wavelength of the light absorbed in this process is fixed by the gas in the cell Cs at a stipulated value. The $I_2$ molecules absorb light with a wavelength of 532.2461 nm. The light which has passed through the iodine ($I_2$) cell Cs is sent to a photoelectric conversion amplifier OE1 and is converted into an electrical signal.

In the resonator mirrors of the above described YAG cw seeder L11 there is an electrostriction element for controlling the resonance length to which the output of the DC bias circuit DB1 is transmitted. Furthermore, a signal with f1 Hz which has been output by a modulator MD1 is transmitted to the DC bias circuit DB1. The above described resonator mirrors oscillate finely with f1 Hz. The wavelengths of the light emerging from the YAG cw seeder L11 and of the light emerging from the Nd:YAG laser light source L2 therefore vary finely.

When the wavelength of the second harmonic of the light emerging from the Nd:YAG laser light source L1 oscillates finely in the vicinity of the absorption spectrum of the $I_2$ molecule, the electrical signal which is output by the photoelectric conversion amplifier OE1 oscillates finely. This signal is transferred to a sensitive phase detector D1.

On the other hand, the signal which is output by the modulator MD1 with f1 Hz is transmitted to the sensitive phase detector D1 which as a result of the phase of the fine oscillation of the electrical signal which has been output by the photoelectric conversion amplifier OE1 and based on the phase of the signal which has been output by the modulator MD1 with f1 Hz generates an output which corresponds to the error between the wavelength of the second harmonic of the light emerging from the Nd:YAG laser light source L1 and the primary wavelength of the absorption spectrum.

The output of the sensitive phase detector D1 is transmitted to the DC bias circuit DB1 which controls the value of the DC bias according to the above described error signal and controls the distance of the resonator mirror of the YAG cw seeder L1.

The wavelength of the light emerging from the YAG cw seeder L11 and the Nd:YAG laser light source L11 is therefore stabilized to twice the wavelength (1064.4922 nm) of the primary wavelength (532.2461 nm) of the above described absorption spectrum.

(2) Generation of coherent light W2

The output of a titanium-sapphire cw seeder L12 is transmitted to the titanium-sapphire laser light source L2 which emits light with the same wavelength as the light emerging from the titanium-sapphire cw seeder L12.

The light emerging from the titanium-laser light source L2 is branched by the beam sampler Bs3 and passes through a xenon (Xe) discharge tube B1.

The xenon (Xe) discharge tube B1 is subject to discharge by the voltage applied by a discharge current source P1. The light branched from the beam sampler Bs3 is absorbed upon passage through the xenon (Xe) discharge tube B1 by the xenon spectrum (wavelength: 708.215 nm).

The light which has passed through the xenon (Xe) discharge tube B1 is incident on a photoelectric conversion amplifier OE2, is converted into an electrical signal and is transmitted to a sensitive phase detector D2 which produces an output which corresponds to the error signal between the wavelength of the light emerging from the titanium-sapphire cw seeder L12 and to the primary wavelength of the absorption spectrum of the xenon (Xe) discharge tube B1, as was described above.

The output of the sensitive phase detector D2 is transmitted to a DC bias circuit DB2 which controls the value of the DC bias according to the above described error signal and controls the resonant length of the resonator mirror of the titanium-sapphire cw seeder L12.

If the wavelength of the light emerging from the titanium-sapphire cw seeder L12 deviates from the primary wavelength of the absorption spectrum, therefore the resonant length of the resonator mirror is controlled.

The wavelength of the light emerging from the titanium-sapphire cw seeder L12 and the titanium-sapphire laser light source L2 is therefore stabilized at 708.215 nm.

The light emerging from the titanium-sapphire laser light source L2 with the stabilized wavelength is transferred to the nonlinear optical crystal C2 (BBO crystal, LBO crystal or CLBO crystal), is converted into light with a wavelength of 354.11 nm as the second harmonic, furthermore transmitted to the nonlinear optical crystal C3 (CLBO crystal) and converted into light with a wavelength of 236.07 nm as the third harmonic.

The light with a wavelength of 236.07 nm generated in the above described manner is transmitted via the mirror M1 and the dichroic mirror DM1 into the nonlinear optical crystal C4 for generating a summed frequency (CLBO crystal).

(3) Generating light with a summed frequency

When the basic laser light W1 (wavelength: 1064.4922 nm) and the coherent light W2 (wavelength: 236.07 nm) are incident on the nonlinear optical crystal C4 for producing a summed frequency (CLBO crystal) with 76.1834° (with an interior angle within the crystal) with reference to the crystal axis, as was described above, the nonlinear optical crystal C4 (CLBO crystal) generates light with a wavelength of 193.221 nm as light with a summed frequency from the basic laser light W1 and the coherent light W2.

Light with summed frequency with a wavelength of 1064.4922 nm and a wavelength of 236.07 nm is emitted from the nonlinear optical crystal C4 (CLBO crystal) together with the above described light with a summed frequency with a wavelength of 193.221. Light with a wavelength of 193.221 nm, i.e. with a wavelength of roughly 193 nm, is branched from these beams by a harmonic separator Hs2.

Figure 14:
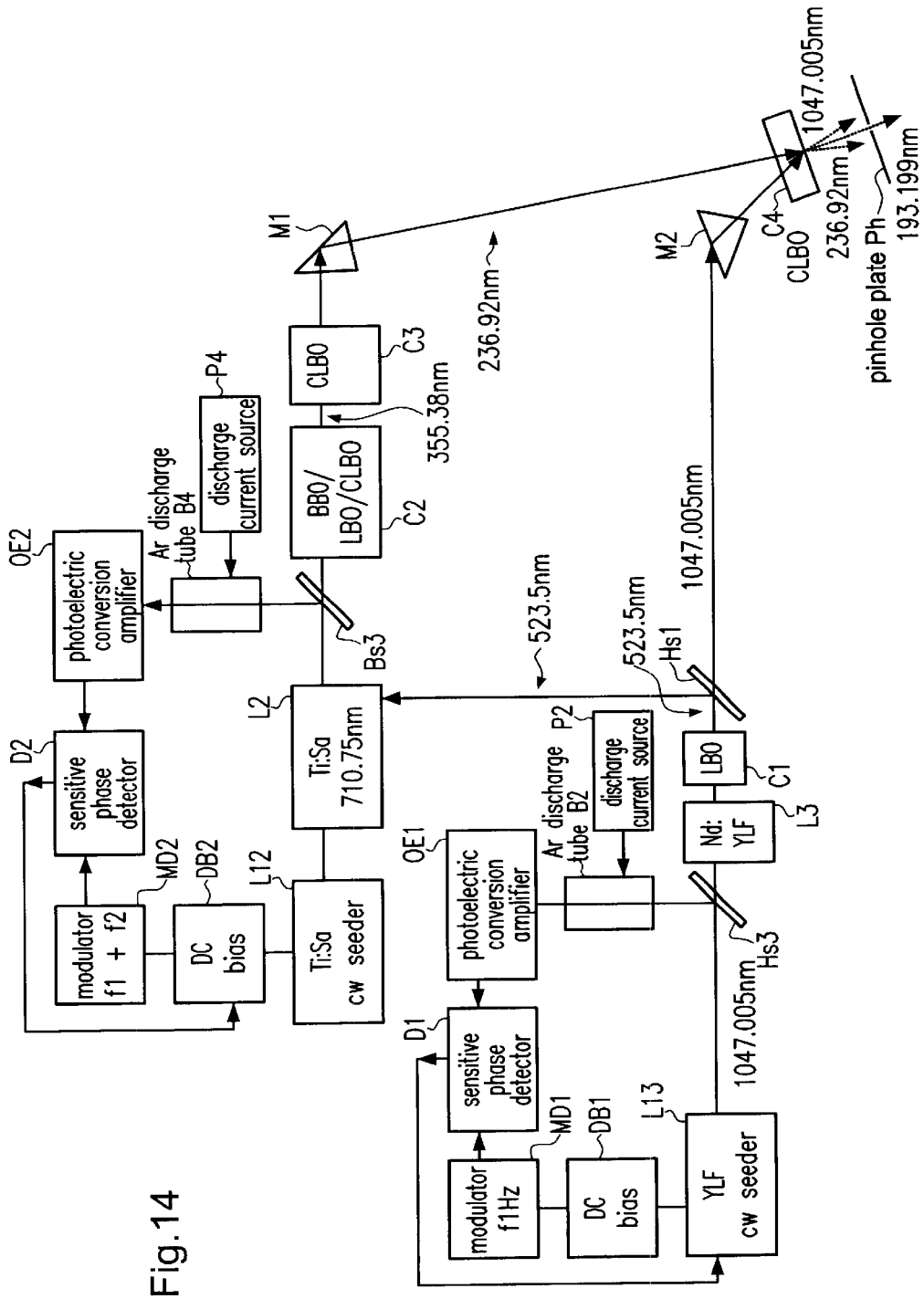
FIG. 14 shows a schematic of one example of the specific arrangement of the light source device shown in FIG. 2(b)

FIG. 14 shows one example of the specific arrangement of the light source device shown in FIG. 2(b). Here a Nd:YLF laser is used as the solid state laser light source and light with a summed frequency is obtained by vector-phase matching.

In FIG. 14 the light with a summed frequency with a wavelength of 193 nm is obtained as follows:

(1) Generating basic laser light W1

The light emitted from a YLF cw seeder L13 i s transmitted to the Nd:YLF laser light source L3, some of the light being separated by a harmonic separator Hs3 and passing through an argon (Ar) discharge tube B2.

The argon (Ar) discharge tube B2 is subject to discharge by the voltage applied by a discharge current source P2. The light branched from the beam sampler Bs3 is absorbed upon passage through the argon (Ar) discharge tube B1 by the neutral argon spectrum (wavelength: 1047.005 nm).

The light which has passed through the argon (Ar) discharge tube B2 is incident on a photoelectric conversion amplifier OE1, is converted into an electrical signal and is transmitted to a sensitive phase detector D1 which produces an output which corresponds to the error signal between the wavelength of the light emerging from the YLF cw seeder L11 and to the primary wavelength of the absorption spectrum of the argon (Ar) discharge tube B2, as was described above.

The output of the sensitive phase detector D1 is transmitted to a DC bias circuit DB1 which controls the value of the DC bias according to the above described error signal and controls the resonant length of the resonator mirror of the YLF cw seeder L13. The wavelength of the light emerging from the YLF cw seeder L13 is thus stabilized at 1047.005 nm.

The Nd:YLF laser light source L3 excited by the YLF cw seeder L13 emits basic laser light W1 with a wavelength of 1047.005 nm. The light emitted by the Nd:YLF laser light source L3 is incident on the nonlinear optical crystal C1 (BBO crystal, LBO crystal or CLBO crystal) which emits basic laser light W1 with a wavelength of 1047.005 nm and light with a wavelength of 523.5 nm as its second harmonic.

After separation of the basic laser light W1 which is emitted by the LBO crystal C1 and its second harmonic by means of a harmonic separator Hs1 the basic laser light W1 is introduced via a mirror M2 into a nonlinear optical crystal C4 for producing a summed frequency (CLBO crystal).

The light separated by the harmonic separator Hs1 with a wavelength of 523.5 nm is sent as excitation light to the titanium-sapphire laser light source L2.

(2) Generating coherent light W2

The output of the titanium-sapphire cw seeder L12 is transmitted to the titanium-sapphire laser light source L2 which emits light with the same wavelength as the light which emerges from the titanium-sapphire cw seeder L12.

The light emitted from a titanium-sapphire laser light source L2 is branched by the beam sampler Bs3 and passes through an argon (Ar) discharge tube B3.

The argon (Ar) discharge tube B3 is subject to discharge by the voltage applied by a discharge current source P3. The light branched from the beam sampler Bs3 is absorbed upon passage through the argon (Ar) discharge tube B3 by the argon spectrum (wavelength: 710.750 nm).

The light which has passed through the argon (Ar) discharge tube B3 is incident on a photoelectric conversion amplifier OE2, is converted into an electrical signal and is transmitted to a sensitive phase detector D2 which produces an output which corresponds to the error signal between the wavelength of the light emerging from the titanium-sapphire cw seeder L12 and to the primary wavelength of the absorption spectrum of the argon (Ar) discharge tube B3, as was described above.

The resonant length of the resonator mirror of the titanium-sapphire cw seeder L12 is controlled by the DC bias circuit DB2.

The wavelength of the light emerging from the titanium-sapphire cw seeder L12 and the titanium-sapphire laser light source L2 is stabilized at 710.750 nm.

The light emerging from the titanium-sapphire laser light source L2 with the stabilized wavelength is transferred to the nonlinear optical crystal C2 (BBO crystal, LBO crystal or CLBO crystal), is converted into light with a wavelength of 355.38 nm as the second harmonic, furthermore transmitted to the nonlinear optical crystal C3 (CLBO crystal) and converted into light with a wavelength of 236.92 nm.

The light generated in the above described manner is incident via the mirror M1 on the nonlinear optical crystal C4 for generating a summed frequency (CLBO crystal).

(3) Generating light with a summed frequency

When the basic laser light W1 (wavelength: 1047.005 nm) and the coherent light W2 (wavelength: 236.92 nm) are incident on the nonlinear optical crystal C4 for producing a summed frequency (CLBO crystal) each with an angle of $\Theta 1$ and an angle of $\Theta 2$ (with an interior angle within the crystal, as was described above) with reference to the crystal axis C, as was described above using FIG. 6, light with a wavelength of 193.199 nm emerges as light with a summed frequency with an angle of $\Theta$ooe (with an interior angle within the crystal) with reference to the crystal axis C.

Furthermore, the basic laser light W1 and the coherent light W2 which have been incident on the nonlinear optical crystal (C4) (CLBO crystal) emerge with angles of $\Theta 1$ and $\Theta 2$, as is illustrated in FIG. 14. On the outlet side of the nonlinear optical crystal C4 (CLBO crystal) there is a pinhole plate Ph from which only light with a summed frequency with 193.199 nm emerges.

In FIG. 13 and FIG. 14, the absorption spectra of xenon (Xe) and argon (Ar) are used for stabilization of the light of the titanium-sapphire laser light source L2. However the absorption spectra of krypton (Kr), helium (He) and argon (Ar) can also be used, as was shown above using FIG. 3. Furthermore, samarium (Sm) can also be used to stabilize a Nd:YAG laser.

In addition, for wavelength stabilization besides the above described use of absorption spectra of atoms or molecules in the discharge tube the photogalvano effect or the technique of saturation absorption can be used (with respect to saturation absorption reference is made to the above described Japanese patent application (HEI 9-112346).

c) Light source device using a timing circuit

The light emitted from the titanium-sapphire laser usually has a delay of a few dozen ns to a hundred and some dozen ns after rising of the excitation light.

On the other hand, the basic laser light W1 has no delay. Therefore it happens that on the nonlinear optical crystal C4 which produces a summed frequency, the two beams do not come to rest on top of one another. If this delay is short, it can be adjusted such that by lengthening the optical path of the basic laser light the two beams come to rest on one another.

The velocity of the light is 30 cm at 1 ns. For a longer delay time therefore a few dozen m are needed for the optical path; this is not practical.

To eliminate this defect it is preferred that in addition to the first solid state laser light source L1 which emits the basic laser light there be a second solid state laser light source which emits excitation light of the titanium-sapphire laser light source L2 and furthermore a timing circuit which sets the times at which the basic laser light L1 emitted by the first solid state laser light source W1 and the excitation light emitted by the second solid state laser light source are produced.

FIG. 15 is a schematic of one example of the arrangement of a light source device which is provided with a timing circuit.

In the drawing reference number L1 labels the above described first solid state laser light source. The generated wavelengths are in the range from 1000 nm to 1800 nm.

In the following, to simplify the explanation a case is described in which as the first solid state laser light source L1 a Nd:YAG laser light source is used which oscillates at 1064.2 nm. Here, by coaxial matching a summed frequency is produced. But instead of a Nd:YAG laser light source a Nd:YLF laser light source which oscillates at 1047 nm or 1053 nm, a Nd:YVO$_4$ laser light source which oscillates at 1084 nm, or a Yb:YAG laser light source which oscillates at roughly 1032 nm can be used. Furthermore, there can be an application for the above described vector-phase matching.

Reference number L4 labels the second solid state laser light source. The generated wavelengths are likewise in the range from 1000 nm to 1800 nm. As is shown in the drawings, a Nd—YAG laser light source, a Nd—YLF laser light source, or a Nd—YVO$_4$ laser light source can be used.

In FIG. 15 the light emerging from the second solid state laser light source L4 is subjected to wavelength conversion by a nonlinear optical crystal C5 for generating a harmonic (CLBO crystal, LBO crystal, BBO crystal, KTP crystal), by which ½ of the wavelength is obtained (532 nm in the case of a Nd—YAG laser light source). The light with this wavelength agrees with the absorption band of the titanium-sapphire crystal and is used as the excitation light of the titanium-sapphire laser light source L2.

The titanium-sapphire laser light source L2 is a laser with variable wavelength which can oscillate in the range from 650 nm to 1000 nm. Therefore it can be oscillated at 707.3 nm. The light emerging from the titanium-sapphire laser light source L2 with a wavelength of 707.3 nm can reach ½ of the wavelength (second harmonic) and ⅓ of the wavelength (third harmonic) by the nonlinear optical crystal C2 (CLBO crystal, LBO crystal, BBO crystal) and the nonlinear optical crystal C3 (CLBO crystal, BBO crystal) respectively. The light emerging from the nonlinear optical crystal C3 therefore becomes coherent light with a wavelength of 235.8 nm.

The titanium-sapphire laser light source L2 starts an oscillation with a delay of a few dozen ns after the rising time of the above described excitation light. The resulting second and third harmonic of the titanium-sapphire laser light source L2 therefore also have a delay to roughly the same degree with respect to the excitation light.

On the other hand, the light emerging from the first solid state laser light source L1 (Nd—YAG laser) remains at the basic waves. The wavelength is therefore 1064 nm and the delay time is 0.

The times at which the oscillation of the first solid state laser light source L1 and of the second solid state laser light source L4 is started are set by a timing circuit T1 which consists for example of a clock generator Ck1 and counters Ct1, Ct2. In the timing circuit T1 the clock pulses from the clock generator Ck1 are counted by the counter Ct1 and the counter Ct2 which each count only a preset number. Upon completion of counting one start signal of the laser light sources L1 and L4 at a time are produced and thus adjustment is done.

When the timing circuit T1 is set such that the start signal of the first solid state laser light source L1 (Nd—YAG laser) is delayed by a few dozen ns to a hundred and some dozen ns relative to the start signal of the second solid state laser light source L4, the basic laser light W1 from the first solid state laser light source L1 (Nd:YAG laser) and the coherent light W2 from the coherent light source which consists of the second solid state laser light source L4 can be overlapped on the optical crystal C4 for generating a summed frequency. Thus, light with a wavelength of roughly 193 nm can be produced, as was described above using FIG. 1(b).

Figure 16:
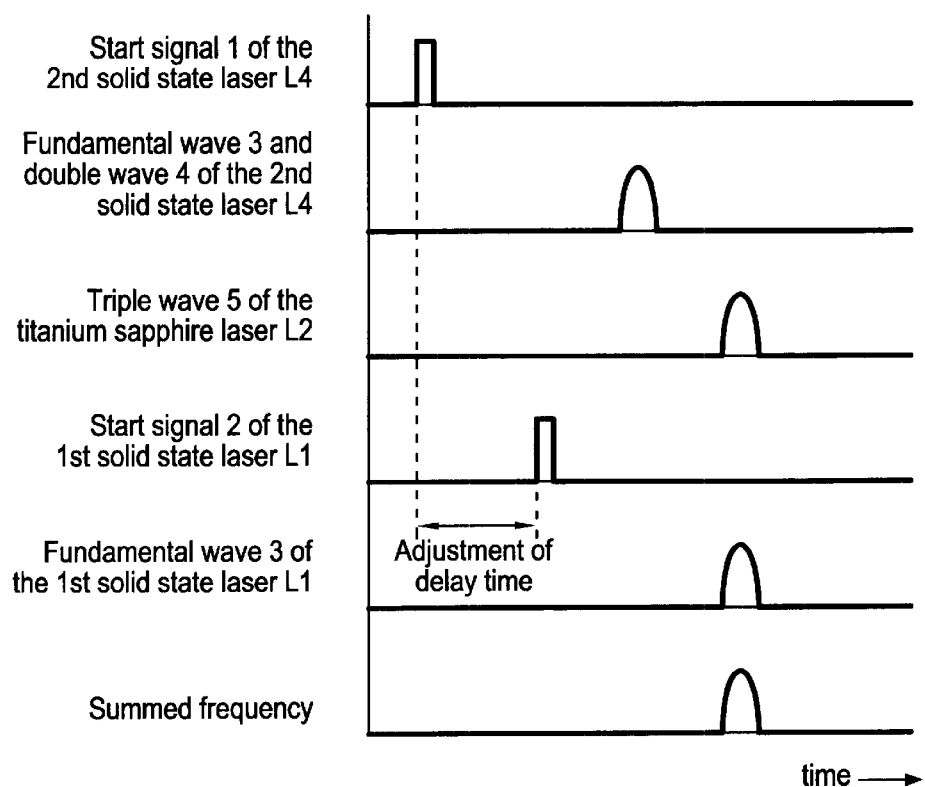
FIG. 16 shows a schematic of the control of timing by the timing circuit.

FIG. 16 is a schematic of the control of timing by the timing circuit T1. As is shown in the drawing, the triple wave 5 of the light emitted by the titanium-sapphire laser light source L2 and the basic wave W1 6 emitted by the first solid state laser light source L1 can be placed on one another on the optical crystal C4 for generating a summed frequency when the timing of the generation of the start signal 2 of the first solid state laser light source L1 (Nd—YAG laser) and the start signal 1 of the second solid state laser light source L4 is set by the timing circuit T1. In this way a wavelength of roughly 193 nm can be produced which is formed by a summed frequency from the basic wave W1 and the coherent light W2.

In the following the control of the oscillation of the laser light sources L1 and L4 by the outputs of the timing circuit T1 is described.

Conventionally, in a laser which executes uninterrupted pulse oscillation, pulses are produced using the Q-switching system. In the Q switching system AO-QSW, ultrasonic waves being used, and EO-QSW using the photoelectric effect are often used.

In the following a YAG laser light source using AO-QSW is described by way of example.

Figure 17A:
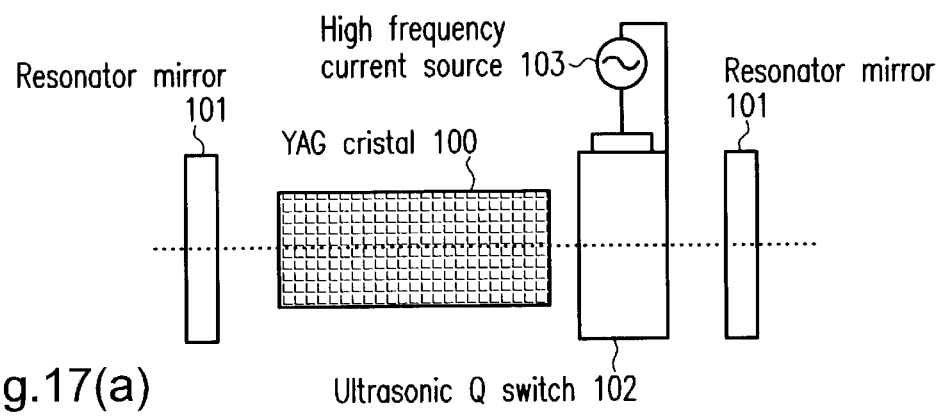
FIG. 17 shows a schematic of the control of the starting time of the laser oscillation by the output of the timing circuit.

As is shown in FIG. 17(a), between a YAG crystal 100 and a resonator mirror 101 there is an ultrasonic Q switch (AO-QSW) 102 which is driven by means of a high frequency current source 103.

Figure 17B:
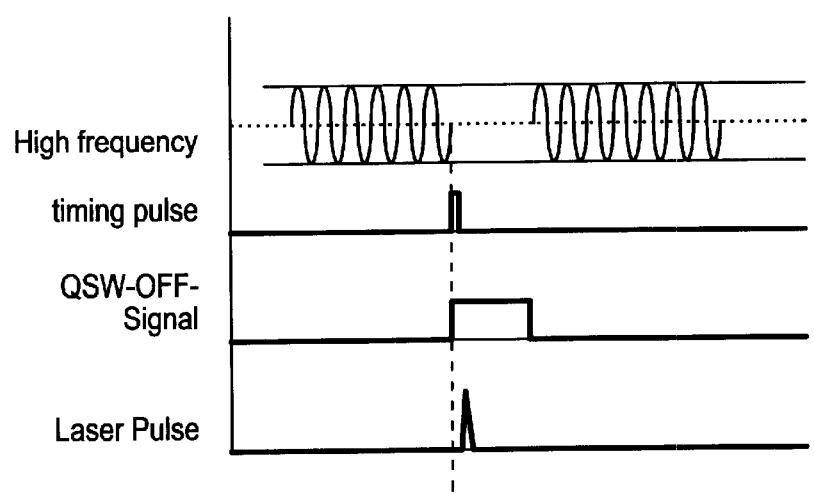

The pulses which are output by the timing circuit T1 act as triggers of the off signals from the high frequency current source 103 which are sent to the ultrasonic Q switch 102. In this way the timing is determined for turning off the high frequency which is applied to the ultrasonic Q switch 102. Oscillation of the laser starts, as is shown in FIG. 17(b), only after the high frequency applied to the ultrasonic Q switch 102 is turned off. Therefore, by adjusting the timing of the pulses which are output by the timing circuit T1 the start time for the laser oscillation can be controlled.

(d) Laser light source which generates a summed frequency twice

A case was described above in which a summed frequency is generated once and light with a wavelength of 193 nm is obtained. However a summed frequency can also be generated twice and light with the wavelength of 193 nm obtained.

Figure 18:
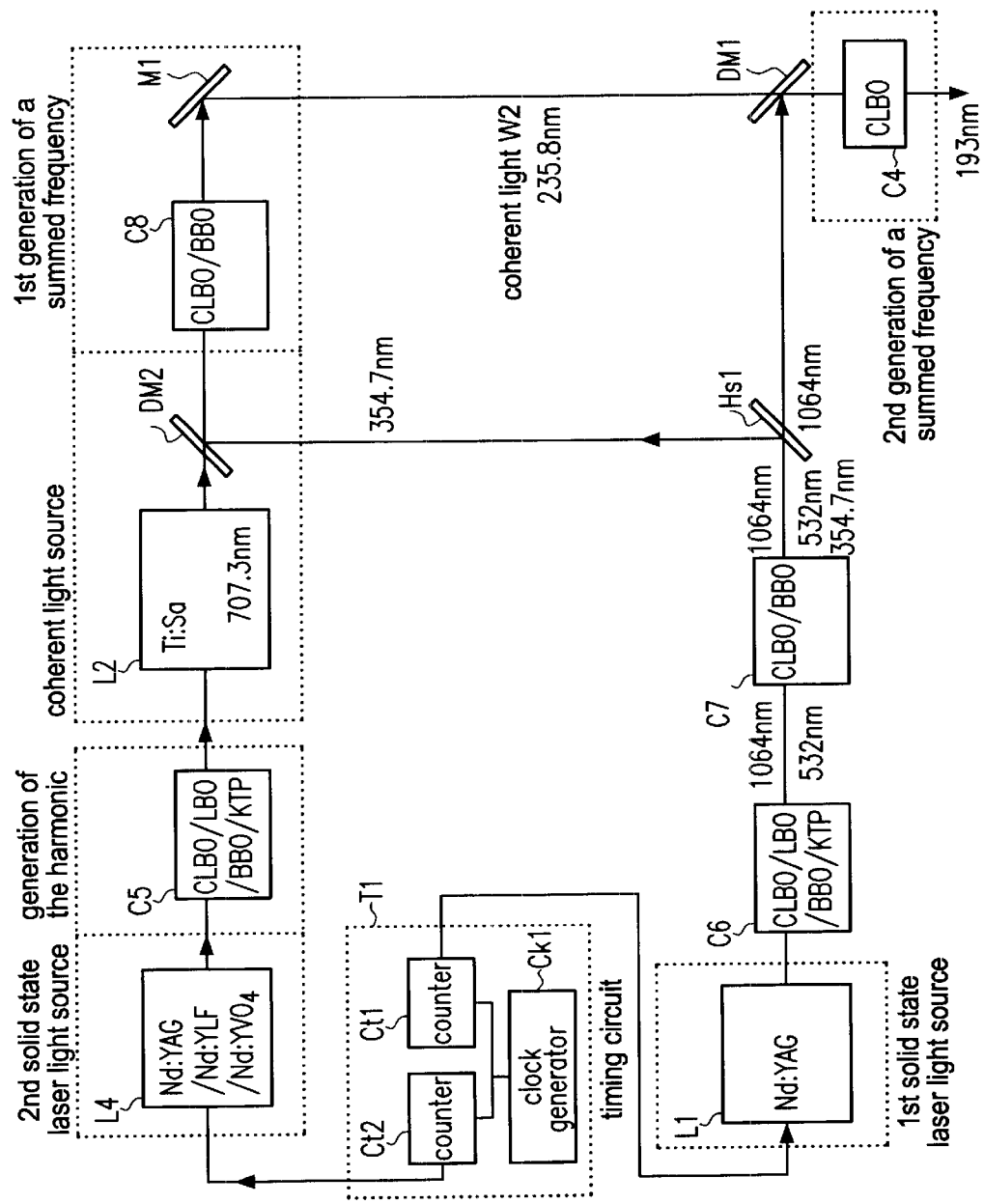
FIG. 18 shows a schematic of one example of the arrangement of a light source device in which the summed frequency is generated twice and light with a wavelength of roughly 193 nm is obtained.

FIG. 18 is a schematic of the arrangement in the case in which a summed frequency is generated twice and light with a wavelength of 193 nm is obtained, as was described above.

In the following, to simplify the explanation a case is described in which a summed frequency is generated using a Nd:YAG laser light source which oscillates at 1064.2 nm, a titanium-sapphire laser light source L2 which is excited by a Nd:YAG/ Nd:YVO$_4$/Nd:YLF laser light source, and using the timing circuit T1 and by coaxial matching. But, as was described above, instead of a Nd:YAG laser light source L1, a YVO$_4$ laser light source which oscillates at 1064 nm, a Nd:YLF laser light source which oscillates at 1047 or 1053 nm, or a Yb:YAG laser light source which oscillates at roughly 1032 nm can be used. Furthermore, vector-phase matching can also be used.

In the following, the process for obtaining light with a summed frequency with a wavelength of 193 nm is described using FIG. 18.

(1) As was described above, the oscillation time of the Nd:YAG laser light source L1 is controlled by the timing circuit T1. The basic laser light W1 is emitted from the Nd:YAG laser light source L1.

The basic laser light W1 (wavelength 1064 nm) emitted from the Nd:YAG laser light source L1 as the first solid state laser light source is incident on a nonlinear optical crystal C6 (CLBO crystal, LBO crystal, BBO crystal, KTP crystal) and generates a second harmonic (wavelength: 532 nm).

(2) The basic laser light W1 (wavelength: 1064 nm) and the second harmonic which are emitted from the nonlinear optical crystal C6 are incident on a nonlinear optical crystal C7 (CLBO crystal, BBO crystal) and generate a third harmonic (wavelength: 354.7 nm).

(3) The basic laser light W1, the second harmonic (wavelength: 532 nm) and its third harmonic (wavelength: 354.7 nm) which are emitted by the nonlinear optical crystal C7 (CLBO crystal, BBO crystal) are separated by the harmonic separator Hs1.

The basic laser light W1 which has passed through the harmonic separator Hs1 is introduced via the dichroic mirror DM1 into the nonlinear optical crystal C4 (CLBO crystal) for second generation of a summed frequency.

(4) The third harmonic (wavelength: 354.7 nm) separated by the harmonic separator Hs1 is introduced via the dichroic mirror DM2 into the nonlinear optical crystal C8 (CLBO crystal, BBO crystal) for initial generation of a summed frequency.

(5) On the other hand, the light emitted by the second solid state laser light source L4 (Nd:YAG/Nd:YLF/Nd:YVO$_4$) with an oscillation time which is controlled by the timing circuit T1 is incident on the nonlinear optical crystal C5 (CLBO crystal, LBO crystal, BBO crystal, KTP crystal) and generates a second harmonic (wavelength: 532 nm).

(6) The titanium-sapphire laser light source L2 is excited by the second harmonic emitted by the nonlinear optical crystal C5. The laser light emitted by the titanium-sapphire laser light source L2 (oscillation wavelength: 707.3 nm) is introduced via the dichroic mirror DM2 into the nonlinear optical crystal C8 (CLBO crystal, BBO crystal) for first generation of a summed frequency.

(7) The timing circuit T1 sets the second solid state laser light source L2 based on the oscillation time of the first solid state laser light source L1 (Nd:YAG) such that it oscillates more rapidly according to the amount of delay of the titanium-sapphire laser light source L2.

(8) From the third harmonic (wavelength: 354.7 nm) of the basic laser light W1 from the first solid state laser light source L1 (Nd:YAG) and from the titanium-sapphire laser light source L2 (oscillation wavelength: 707.3 nm) the nonlinear optical crystal C8 (CLBO crystal, BBO crystal) for first generation of a summed frequency produces the coherent light W2 with 235.8 nm as a summed frequency of the two.

(9) The coherent light (wavelength: 235.8 nm) obtained by the nonlinear optical crystal C8 (CLBO crystal, BBO crystal) for first generation of a summed frequency is introduced via the mirror M1 and the dichroic mirror DM1 into the nonlinear optical crystal C4 (CLBO crystal) for second generation of a summed frequency.

(10) From the basic laser light W1 (wavelength: 1064 nm) and the coherent light W2 (wavelength: 235.8 nm) the nonlinear optical crystal C4 (CLBO crystal) for second generation of a summed frequency produces light with 193 nm as a summed frequency of the two.

The wavelengths of the light emitted by the Nd:YAG laser light source L1 and the titanium-sapphire laser light source L2 can be stabilized using the line spectral regions of the atoms with spectra which are essentially equal to the desired wavelengths and using the absorption spectral regions of the molecules, as was described above.

FIG. 19 is a schematic of the spectral regions of the atoms of the Nd:YAG laser light source L1, the Nd:YLF laser light source and the titanium-sapphire laser light source L2 which can be used for wavelength stabilization in a light source device in which generation of a summed frequency with 193 nm is produced.

Furthermore, in the case in which instead of the Nd:YAG laser light source L1 a Nd:YVO$_4$ laser light source is used, wavelength stabilization can likewise be done by the spectral regions of the atoms according to FIG. 19(*a*). Furthermore, wavelength stabilization can be done by the spectral regions of the atoms according to FIG. 19 also in the case of using the OPO oscillator described below instead of the titanium-sapphire laser light source L2.

As is shown in FIG. 19(*a*), the titanium-sapphire laser light source L2 is subjected to wavelength stabilization using the absorption spectra of xenon (Xe), krypton (Kr), helium (He) and argon (Ar).

Light with a wavelength of 193 nm can be obtained by stabilization of the Nd:YAG/Nd:YVO$_4$ laser light source L1 using the absorption spectra of iodine molecules (I$_2$) or of samarium (Sm).

Furthermore, as is shown in FIG. 19(*b*), light with a wavelength of 193 nm can be obtained by wavelength stabilization of the titanium-sapphire laser light source L2 using the absorption spectra of xenon (Xe), neon (Ne), krypton (Kr) and argon (Ar) in the same manner as described above and by stabilizing the Nd:YLF laser light source L3 using the absorption spectrum of argon (Ar).

For example, the wavelength of the titanium-sapphire laser light source L2 can be stabilized using the spectrum of xenon (Xe) at 708.215 nm.

On the other hand, there is the absorption spectrum of iodine (I$_2$) molecules (wavelength: 532.2461 nm) as the absorption spectra of the molecules with wavelengths which are essentially equal to the double waves of the basic laser light W1 which is emitted by the Nd:YAG/Nd:YVO$_4$ laser light source. Light with 1064.492 nm is obtained by stabilization of the wavelength of the Nd:YAG laser/Nd:YVO$_4$ light source L1 with the use thereof as basic laser light W1.

The light with 708.215 nm emitted from the titanium-sapphire laser light source L2 and the third harmonic of the basic laser light W1 with 1064.492 nm are incident on the nonlinear optical crystal C8 for first generation of a summed frequency. In this way, as the summed frequency thereof coherent light W2 with 236.393 nm is obtained.

Light with 193.436 nm is obtained as light with a summed frequency from the coherent light W2 with 236.938 nm which is obtained from the nonlinear optical crystal C8 for first generation of a summed frequency, and from light with a wavelength of 1064.492 nm (FIG. 19 1).

Coherent light W2 with 236.302 nm can be obtained from the nonlinear optical crystal C7 for first generation of a summed frequency in the case likewise that using the spectrum of krypton (Kr) the wavelength of the titanium-sapphire laser light source L2 is stabilized at 707.397 nm. Light with 193.375 nm according to FIG. 19 can be obtained as light with a summed frequency with the above described basic laser light W1 with 1064.492 nm (FIG. 19 2).

As is described above, light with 193.310 nm and 193.625 nm can be obtained as light with a summed frequency by stabilization of the wavelength of the titanium-sapphire laser light source L2 using the spectra of helium (He) and argon (Ar) (FIG. 19 3, 4).

Furthermore, light with 193 nm can be obtained by stabilization of the wavelength of the Nd:YAG laser/Nd:YVO$_4$ light source L1 using the absorption spectrum of samarium (Sm) (FIG. 19(*a*) 5 to 8).

On the other hand, there is the spectrum of neutral argon (wavelength: 1047.005 nm, hereinafter called "ArI spectrum") as the line spectra of the atoms with wavelengths which are essentially equal to the basic laser light which is emitted by the Nd:YLF laser light source. Light with a wavelength of 1047.005 nm can be obtained by stabilization of the wavelength of the Nd:YLF laser light source using the above described spectrum as basic laser light W1, as shown in FIG. 19(*b*).

As was described above, light with 738.600 nm can be obtained by stabilization of the wavelength of the titanium-sapphire laser light source L2 using the spectrum of xenon (Xe). Therefore light with 237.010 nm can be obtained from the nonlinear optical crystal C8 for first generation of a summed frequency as light with a summed frequency with the third harmonic of the basic laser light with a wavelength of 1047.005 nm. Therefore, light with 193.262 nm can be obtained as light with a summed frequency from light with 237.010 nm which is emitted from the nonlinear optical crystal C8 for first generation of the summed frequency and from the basic laser light.

Light with 193.622 nm, 193.405, and 193.248 nm can be obtained as light with a summed frequency by stabilization of the wavelength of the titanium-sapphire laser light source L2 using the spectra of neon (Ne), krypton (Kr) and argon (Ar), as is illustrated in FIG. 19.

(2) Light source device using an OPO oscillator

In the above description, light with 235.8 nm is produced using the titanium-sapphire laser light source L2 which is excited by the harmonic of the solid state laser light source L1 or L4. This light was used as coherent light of the coherent light source and a summed frequency was obtained from this and the basic laser light which is emitted by the Nd—YAG laser light source or the like.

In the following, the process for using an OPO oscillator instead of the above described titanium-sapphire laser light source is described. The OPO oscillator, using a nonlinear optical crystal such as BBO crystal or the like, divides pump light into beams with two wavelengths with a summed frequency which is identical to the frequency of the pump light. The OPO oscillator is arranged such that on the two ends of the crystal there is a reflector which is in resonance with one of the beams with the two wavelengths. In this way the generated light is amplified by the resonance and the conversion efficiency is increased.

In the following, to simplify the explanation a case is described in which a summed frequency is produced using a solid state laser light source of a Nd:YAG laser which oscillates at 1064.2 nm, and by coaxial matching. As was described above, instead of a Nd:YAG laser light source a Nd:YLF laser light source which oscillates at 1047 nm or 1053 nm, a Nd:YVO$_4$ laser light source which oscillates at 1064 nm, or a Yb:YAG laser light source which oscillates at roughly 1032 nm can be used. Furthermore, a summed frequency can also be obtained by vector-phase matching.

(a) Basic arrangement

Figure 20:
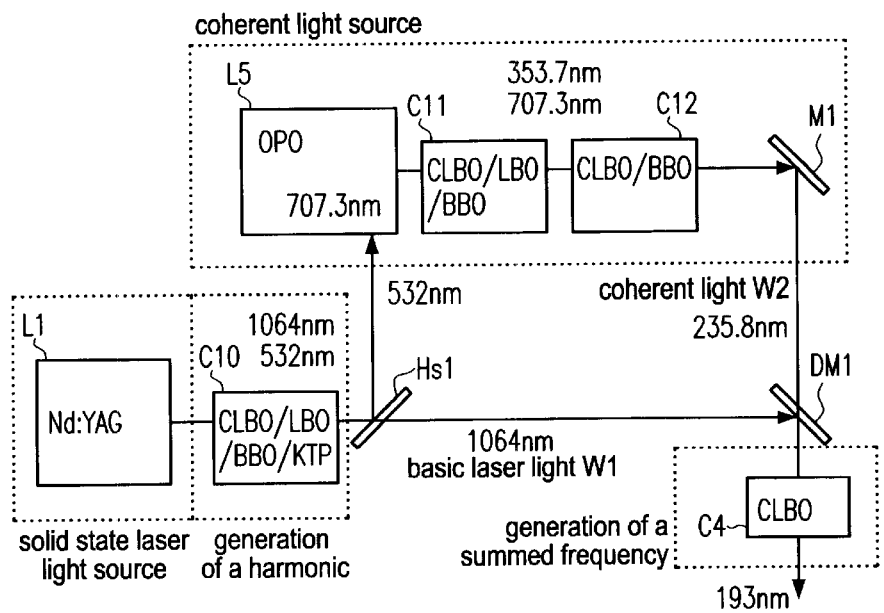
FIG. 20 shows a schematic of the basic arrangement of a light source device using an OPO oscillator (excitation by a second harmonic)

FIG. 20 is a schematic of one example of the arrangement of a light source device using the OPO oscillator for generating a summed frequency from the coherent light source of a coherent light source and the basic wave from the solid state laser light source. Here a case is shown in which an OPO oscillator L5 is excited by the second harmonic of the solid state laser light source L1 (Nd:YAG).

In FIG. 20 light with a summed frequency with a wavelength of 193 nm is obtained as follows:

(1) The basic laser light W1 (wavelength: 1064 nm) which is emitted from the ND:YAG laser light source L1 is allowed to be incident on a nonlinear crystal C10 (CLBO crystal, LBO crystal, BBO crystal, KTP crystal) and thus produces a second harmonic (wavelength: 532 nm).

(2) The basic laser light W1 which has been emitted by the nonlinear optical crystal C10 and its second harmonic are separated by the harmonic separator Hs1. The basic laser light which has passed by the harmonic separator Hs1 is introduced via the dichroic mirror DM1 into the nonlinear optical crystal C4 for generation of a summed frequency (a CLBO crystal).

(3) The second harmonic separated by the harmonic separator Hs1 is introduced into the OPO oscillator L5 and becomes pump light of the OPO oscillator L5. The OPO oscillator L5 from the pump light generates coherent light with two wavelengths (707.3 nm and 2146.5 nm in the example in the drawing) with a summed frequency which is identical to the frequency of the pump light.

(4) From the generated two beams the coherent light with a wavelength of 707.3 nm is allowed to be incident on a nonlinear optical crystal C11 (CLBO crystal, LBO crystal, BBO crystal), thus producing a second harmonic (wavelength: 353.7 nm).

(5) The light emitted from the nonlinear optical crystal C11 with wavelengths of 707.3 nm and 353.7 nm is allowed to be incident on a nonlinear optical crystal C12 (CLBO crystal or BBO crystal), thus producing a third harmonic (wavelength: 235.8 nm).

(6) The coherent light W2 (wavelength: 235.8 nm) obtained from the nonlinear optical crystal C3 is introduced via the mirror M1 and the dichroic mirror DM1 into the nonlinear optical crystal C4 for generating a summed frequency (CLBO crystal).

(7) The nonlinear optical crystal C4 for generating a summed frequency (CLBO crystal) generates from the above described basic laser light W1 (wavelength: 1064 nm) and the above described coherent light W2 (wavelength: 235.8 nm) light with a summed frequency with 193 nm.

The wavelengths of the solid state laser light source L1 and of the OPO oscillator L5 in FIG. 20 can be stabilized by the line spectral regions of the atoms according to FIG. 3.

As is shown in FIG. 3(*a*), light with a wavelength of 193 nm can be obtained by stabilizing the wavelength of the OPO oscillator L5 using the absorption spectra of xenon (Xe), krypton (Kr), helium (He) and argon (Ar) and by stabilization of the Nd:YAG laser light source L1 using the absorption spectra of iodine (I$_2$) molecules or samarium (Sm).

Furthermore, as is shown(in FIG. 3(*b*), light with a wavelength of 193 nm can be obtained by stabilizing the wavelength of the OPO oscillator L5 using the spectra of xenon (Xe), neon (Ne), krypton (Kr) and argon (Ar) and by stabilizing the Nd:YLF laser light source using the absorption spectrum of argon when a Nd:YLF laser light source is used as the solid state laser light source L1.

Figure 21:
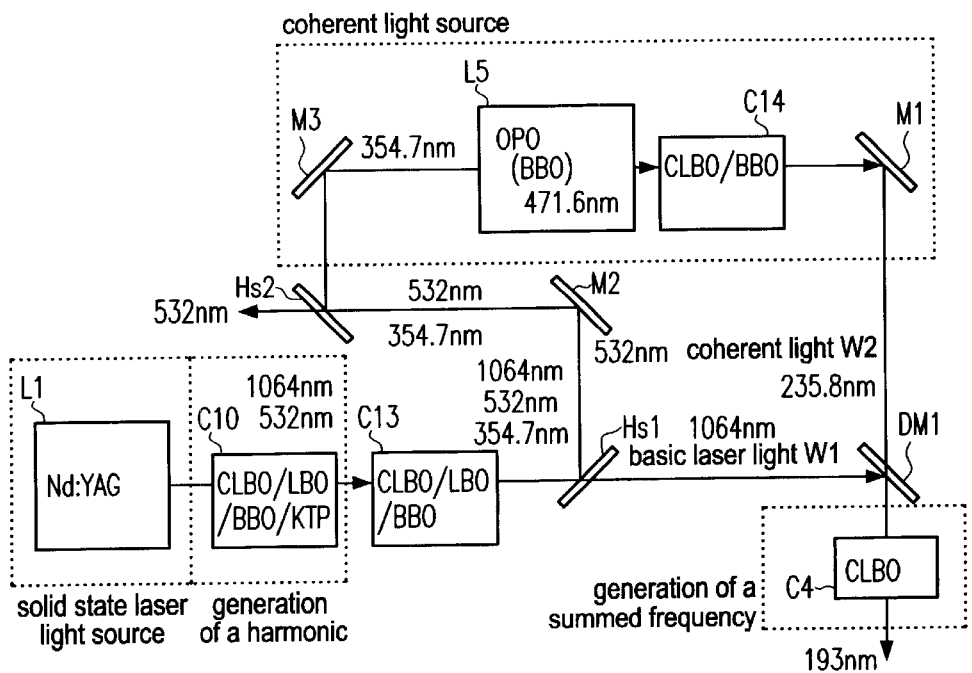
FIG. 21 shows a schematic of the basic arrangement of a light source device using an OPO oscillator (excitation by a third harmonic)

FIG. 21 is a schematic of another example of the arrangement of a light source device using the OPO oscillator for generating a summed frequency from the coherent light of a coherent light source, and the basic wave from the solid state laser light source. Here a case is shown in which the OPO oscillator L5 is excited by the third harmonic of the solid state laser light source L1.

In FIG. 21 light with a summed frequency with a wavelength of 193 nm is obtained as follows:
(1) The basic laser light W1 (wavelength: 1064 nm) which is emitted from the Nd:YAG laser light source L1 is allowed to be incident on a nonlinear crystal C10 (CLBO crystal, LBO crystal, KTP crystal or BBO crystal) and thus a second harmonic (wavelength: 532 nm) is produced.
(2) The basic laser light W1 (wavelength: 1064 nm) which has been emitted by the nonlinear crystal C10 and its second harmonic are incident on the nonlinear optical crystal C13 (CLBO crystal, LBO crystal, BBO crystal) and generate a third harmonic (wavelength: 354.7 nm).
(3) The basic laser light W1 (wavelength: 1064 nm) which has been emitted by the nonlinear optical crystal C13 (CLBO crystal, LBO crystal, BBO crystal), its second harmonic (wavelength: 532 nm) and its third harmonic (wavelength: 354.7 nm) are separated by means of the harmonic separator Hs1. The basic laser light W1 which has been passed by the harmonic separator Hs1 is introduced via the dichroic mirror DM1 into the nonlinear optical crystal C4 for generation of a summed frequency (CLBO crystal).
(4) The third harmonic (wavelength: 354.7 nm) separated by the harmonic separator HS1 is introduced via the mirror M2, the harmonic separator Hs2 and the mirror M3 into the OPO oscillator and becomes pump light of the OPO oscillator L5. The OPO oscillator L5 from the pump light generates coherent light with two wavelengths (one 471.6 nm and one 1430.4 nm in the example in the drawing) with a summed frequency which is identical to the frequency of the pump light.
(5) From the generated two beams the coherent light with a wavelength of 471.6 nm is allowed to be incident on a nonlinear optical crystal C14 (CLBO crystal, thus producing a second harmonic (wavelength: 285.8 nm) of this light.
(6) The coherent light W2 (wavelength: 235.8 nm) obtained from the nonlinear optical crystal C14 is introduced via the mirror M1 and the dichroic mirror DM1 into the nonlinear optical crystal C4 for generating a summed frequency (CLBO crystal).
(7) The nonlinear optical crystal C4 for generating a summed frequency (CLBO crystal) generates from the above described basic laser light W1 (wavelength: 1064 nm) and the above described coherent light W2 (wavelength: 235.8 nm) light with a summed frequency with 193 nm.

The wavelengths of the solid state laser light source L1 and the OPO oscillator L5 in FIG. 21 can be stabilized by the line spectral regions of the atoms according to FIG. 22.

As is shown in FIG. 22(a), light with a wavelength of 193 nm can be obtained by stabilizing the wavelength of the OPO oscillator L5 using the absorption spectra of samarium (Sm), xenon (Xe), krypton (Kr), and argon (Ar) and by stabilization of the Nd:YAG/YVO$_4$ laser light source L1 using the absorption spectra of iodine (I$_2$) molecules or samarium (Sm).

Furthermore, as is shown in FIG. 22(b), light with a wavelength of 193 nm can be obtained by stabilizing the wavelength of the OPO oscillator L5 using the spectra of samarium (Sm), xenon (Xe), krypton (Kr) and argon (Ar) and by stabilizing the Nd:YLF laser light source using the absorption spectrum of argon (Ar) light when the Nd:YLF laser light source is used as the solid state laser light source L1.

A case was described above in which generation of a summed frequency is done once and thus light with 193 nm is produced. However, in a light source device using the OPO oscillator a summed frequency can be generated twice and light with 193 nm can be produced, as is also the case in the light source device using the above described titanium-sapphire laser light source.

Figure 23:
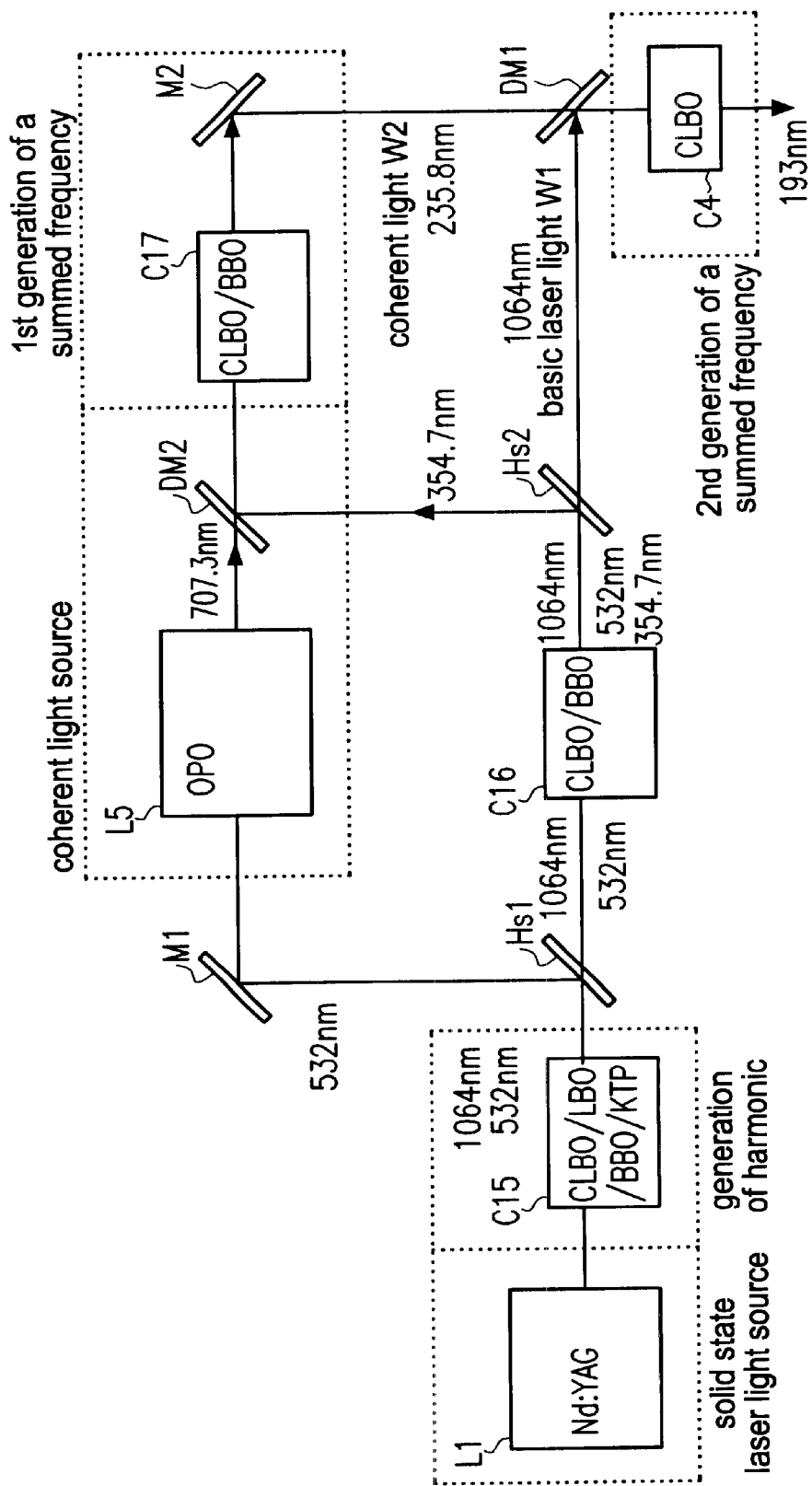
FIG. 23 shows a schematic of the basic arrangement of a light source device using an OPO oscillator in which a summed frequency is generated twice and light with roughly 193 nm is produced.

FIG. 23 is a schematic of one example of the arrangement of a light source device in which a summed frequency is generated twice and thus light with 193 nm is obtained.

In FIG. 23 the light with a summed frequency with a wavelength of 193 nm is obtained as follows:
(1) The fundamental wave laser light W1 is emitted from the Nd:YAG laser light source L1.
The basic laser light W1 (wavelength: 1064 nm) which is emitted from the Nd:YAG laser light source L1 is allowed to be incident on a nonlinear optical crystal C15 (CLBO crystal, LBO crystal, BBO crystal or KTP crystal) and thus a second harmonic (wavelength: 532 nm) is produced.
(2) The basic laser light W1 which has been emitted by the nonlinear crystal C15 (CLBO crystal, LBO crystal, BBO crystal, KTP crystal) and its second harmonic (wavelength: 532 nm) are incident on the nonlinear optical crystal C16 (CLBO crystal, BBO crystal) via the harmonic separator Hs1 and generate a third harmonic (wavelength: 354.7 nm).
(3) The light which has been emitted by the nonlinear optical crystal C16 (CLBO crystal, BBO crystal) is separated by means of the harmonic separator Hs2. The third harmonic (wavelength: 354.7 nm) is introduced via the dichroic mirror DM2 into the nonlinear optical crystal C17 for generation of a summed frequency.
(4) The second harmonic (wavelength: 532 nm) separated by the harmonic separator Hs1 is introduced via the mirror M1 into the OPO oscillator L5 and becomes pump light of the OPO oscillator L5. The OPO oscillator L5 from the pump light generates coherent light with two wavelengths (one 707.3 nm and one 2146.5 nm in the example in the drawing) with a summed frequency which is identical to the frequency of the pump light.
(4) From the two generated beams the coherent light with a wavelength of 707.3 nm is introduced into the nonlinear optical crystal C17 (CLBO crystal, BBO crystal) via the dichroic mirror M2 for first generation of a summed frequency.
(5) The nonlinear optical crystal C17 for first generation of a summed frequency (CLBO crystal, BBO crystal) generates from the third harmonic (wavelength: 354.7 nm) of the basic laser light from the Nd:YAG laser light source L1 and the above described coherent light of the OPO oscillator L5 (wavelength: 707.3 nm) coherent light W2 with 235.8 nm as light with a summed frequency.
(6) The coherent light (wavelength: 235.8 nm) which is obtained from the nonlinear optical crystal C17 for first generation of a summed frequency (CLBO crystal, BBO crystal) is introduced via the mirror M2 and the dichroic mirror DM1 into the nonlinear optical crystal C4 for second generation of a summed frequency (CLBO crystal).

(7) The nonlinear optical crystal C4 for second generation of a summed frequency (CLBO crystal) generates from the above described basic laser light W1 (wavelength: 1064 nm) and the above described coherent light W2 (wavelength: 235.8 nm) light with a summed frequency with 193 nm.

The wavelengths of the solid state laser light source L1 and the OPO oscillator L5 in FIG. 22 can be stabilized by the line spectral regions of the atoms according to FIG. 19.

As is shown in FIG. 19(a), light with a wavelength of 193 nm can be obtained by stabilizing the wavelength of the OPO oscillator L5 using the absorption spectra of xenon (Xe), krypton (Kr), helium (He) and argon (Ar) and by stabilization of the Nd:YAG/YVO$_4$ laser light source L1 using the absorption spectra of iodine (I$_2$) molecules or samarium (Sm).

Furthermore, as is shown in FIG. 19(b), light with a wavelength of 193 nm can be obtained by stabilizing the wavelength of the OPO oscillator L5 using the spectra of xenon (Xe), neon (Ne), krypton (Kr) and argon (Ar) and by stabilizing the Nd:YLF laser light source using the absorption spectrum of argon (Ar) light when the Nd:YLF laser light source is used as the solid state laser light source L1.

(b) Example of the specific arrangement of a light source device using the OPO oscillator In the following one example of the specific arrangement of the light source device shown in FIG. 21 is illustrated. In the following one example of the arrangement of the light source device shown in FIG. 21 using a YAG laser light source is described in which the OPO oscillator is excited by the third harmonic. But the same thing can also be done with the light source devices shown in FIGS. 20 and 23.

Furthermore, as was described above, in the case of using a Nd:YLF laser light source which oscillates at 1053 nm, a Nd:YVO$_4$ laser light source which oscillates at 1064 nm, or a Yb:YAG laser light source which oscillates at roughly 1032 nm, the same thing can also be done by wavelength stabilization using a means for wavelength stabilization or the like according to FIG. 3, FIG. 19 and FIG. 22.

Figure 24:
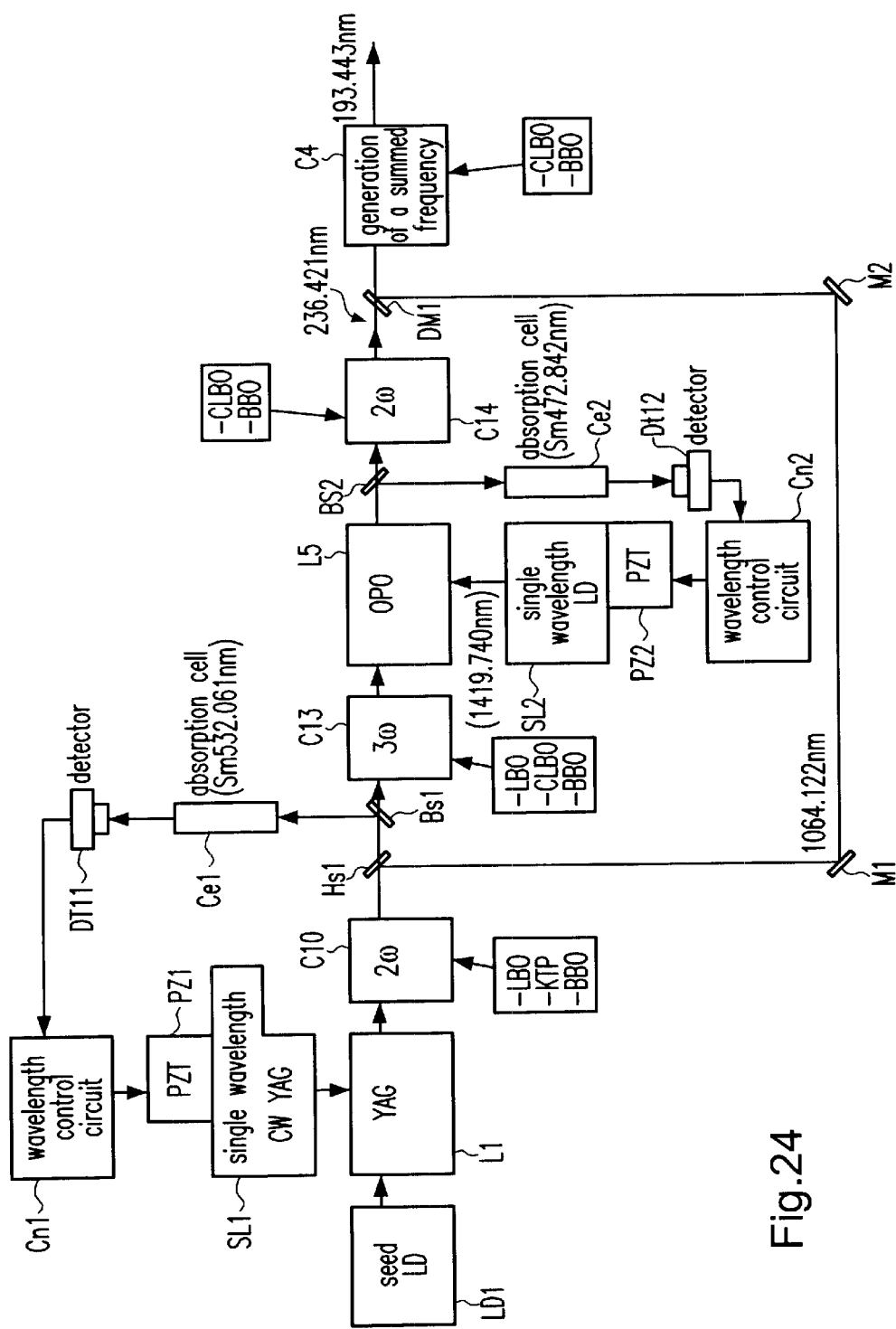
FIG. 24 shows a schematic of one example of the specific arrangement of the light source device shown in FIG. 21.

FIG. 24 is a schematic of one example of the specific arrangement of the light source device shown in FIG. 21 using an OPO oscillator which has a means for wavelength stabilization.

(1) The light (basic wave with a wavelength of 1064 nm) from the Nd:YAG laser light source L1 which has been excited by a semiconductor laser LD1 for excitation is introduced into the crystal C10 (LBO crystal, KTP crystal, BBO crystal) for generating a harmonic.

(2) The crystal C10 for generating a harmonic converts part of the light emitted from the Nd:YAG laser light source L1.

(3) From the light which has emerged from the crystal C10 for generating a harmonic, part of the basic laser light W1 is reflected by the harmonic separator Hs1. The reflected light is introduced via the mirror M1 and the mirror M2 into the nonlinear optical crystal C4 for generating a summed frequency (CLBO crystal, BBO crystal).

(4) From the light (wavelengths: 1064 nm and 532 nm) which has been passed by the harmonic separator Hs1 part of the light with 532 nm is reflected by a beam splitter Bs1 and introduced into an absorption cell Ce1, while the other light is passed by the beam splitter Bs1 and is introduced into the nonlinear optical crystal C13 for generating a third harmonic (LBO crystal, CLBO crystal, BBO crystal).

(5) The light which has been passed by the absorption cell Ce1 (wavelength: 532 nm) is absorbed by the samarium (Sm) atoms within the absorption cell. The degree of absorption changes depending on the amount of deviation of the wavelength from the absorption line of the samarium (Sm) (primary wavelength: 532.061 nm). This amount of absorption is determined by a detector Dt11 and a wavelength control circuit Cn1 which is located behind the detector Dt11.

(6) In the wavelength control circuit Cn1 the difference between the second harmonic of the Nd:YAG laser light source L1 and the absorption line of samarium (Sm) is determined and by the electrostriction element Pz1 the length of the resonator of a single wave YAG laser SL1 is controlled such that the wavelength of the second harmonic of the Nd:YAG laser light source L1 agrees with the center of the absorption line of samarium (Sm).

(7) The light which emerges from the single wave YAG laser with a wavelength which agrees with the center of the absorption line of samarium (Sm) is introduced into the resonator of the Nd:YAG laser light source L1 which oscillates the basic laser light W1.

The Nd:YAG laser light source L1 which oscillates the basic laser light W1 is controlled such that it oscillates by the introduced wavelength. This yields a wavelength of 1064.122 nm.

(8) The light which has passed through the beam splitter Bs1 in (4) (wavelengths: 1064.122 nm and 532.061 nm) is introduced into the nonlinear optical crystal C13 (LBO crystal, CLBO crystal, BBO crystal) and generates a third harmonic (wavelength: 354.707 nm) which is introduced into the OPO oscillator L5 and acts as pump light of the OPO oscillator L5.

(9) By means of the pump light which is incident on the OPO oscillator L5 (wavelength: 354.707 nm) the OPO crystal produces light with two wavelengths due to its nonlinearity effect.

The sum of the respective reciprocal numbers of the two wavelengths produced in this process ($\lambda 1, \lambda 2$) agrees with the reciprocal number of a wavelength of $\lambda o$ of the incident pump light as is shown below by the formula:

$$1/\lambda o = (1/\lambda 1) + 1/\lambda 2$$

From the light which has been emitted by the OPO oscillator L5, part is reflected by a beam splitter Bs2 and introduced into an absorption cell Ce2 which is filled with samarium (Sm), while the other light is passed by the beam splitter Bs2 and introduced into the nonlinear optical crystal C14 for generating a second harmonic (CLBO crystal, BBO crystal).

(10) The light which has been passed by the absorption cell Ce2 is absorbed by the samarium (Sm) atoms within the absorption cell and the amount of absorption is determined by a detector Dt12 and a wavelength control circuit Cn2 which is located behind the detector Dt12.

(11) In the wavelength control circuit Cn2 the difference between the wavelength of the light emitted by the OPO oscillator L5 and the absorption line of samarium (Sm) is determined and by the electrostriction element Pz2 the length of the resonator of a single wave YAG laser SL2 is controlled such that the wavelength of the light emitted by the OPO oscillator L5 agrees with the center of the absorption line of samarium (Sm).

In the following, actuation for stabilization of the frequency of the OPO oscillator L5 is described using FIG. 25.

For the OPO oscillator L5 there are many cases in which the resonator is set such that it is in resonance with one of the two generated wavelengths (but rarely there are also cases in which it is set such that it is in resonance at the same time with the two wavelengths).

Figure 25:
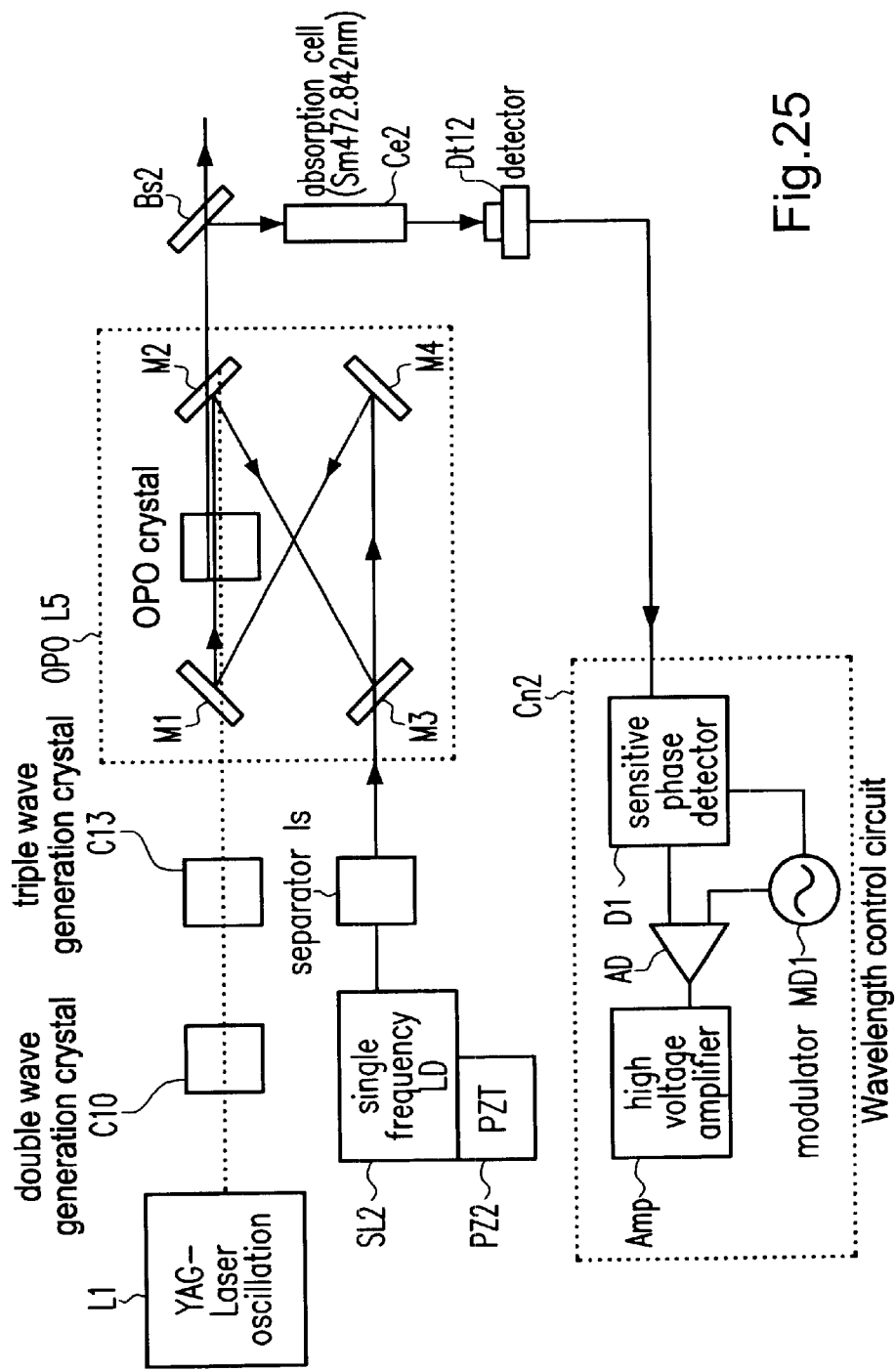
FIG. 25 shows a schematic of the wavelength stabilization of the light source device shown in FIG. 24.
Figure 26:
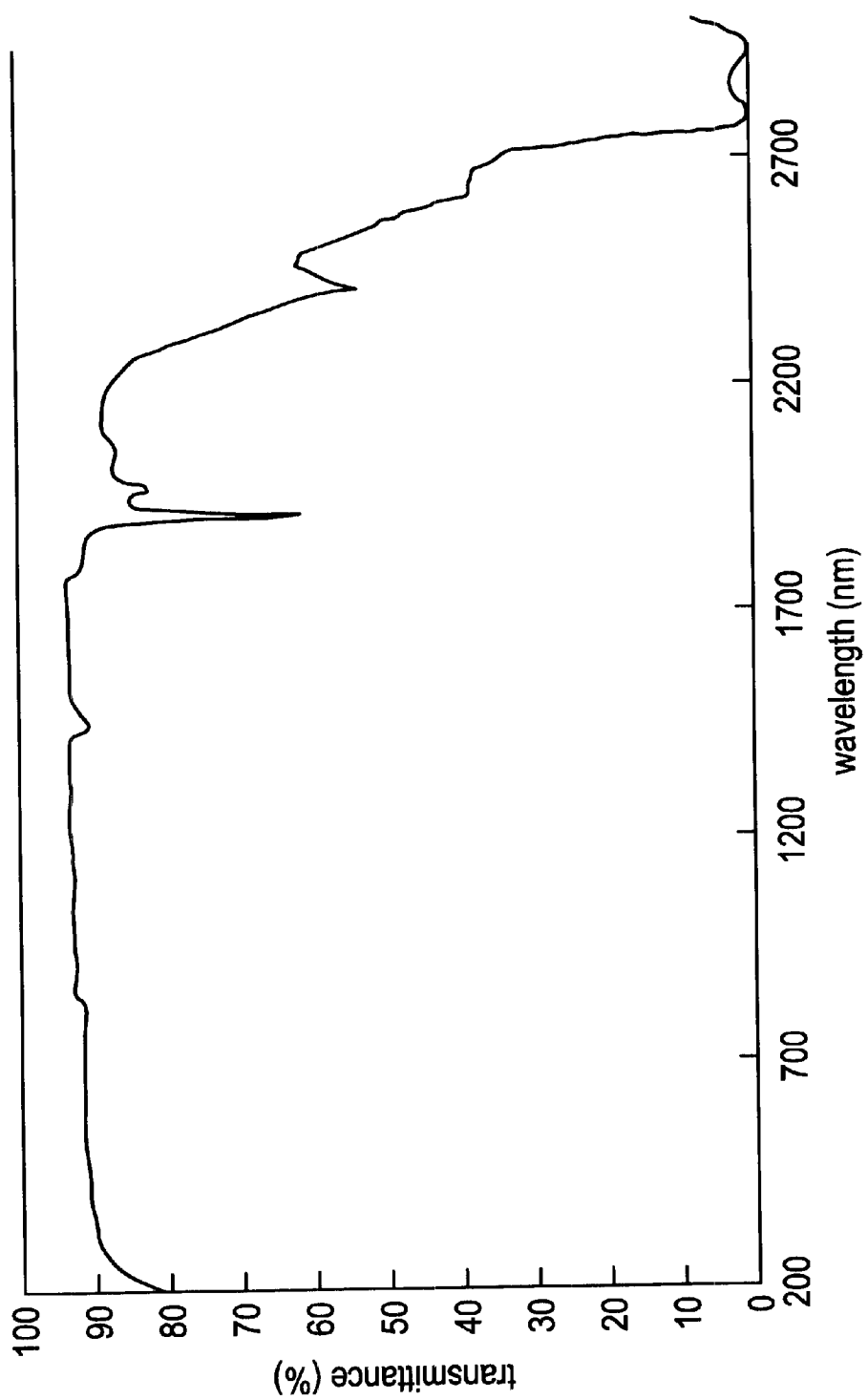
FIG. 26 shows a schematic of the transmission spectrum in the UV-IR range of a CLBO crystal.

FIG. 25 shows a case in which an annular resonator is arranged through the resonator mirror M1, M2, M3, and M4. But the resonator is not limited to an annular design, but a resonator of the round-trip type can be used in which there are two mirrors located parallel to one another.

In the case of stabilization of the OPO oscillator L5 the wavelength which oscillates in the above described annular resonator is designated λ1, while the wavelength which is used in practice can be designated λ2. This method can increase the conversion efficiency because the light with a wavelength of λ1 is amplified on alternating sides within the resonator. But it is also possible to resonate with the wavelength λ2 to be used.

FIG. 25 shows a case in which oscillation takes place with a wavelength of λ1. The wavelength of λ2 used in this case is 472.842 nm. Since the wavelength of the pump light Aλ0 is 354.707 nm, λ1 is 419.740 according to the above described formula.

First, the light of the semiconductor laser SL2 which oscillates at a wavelength of roughly 1419.740 nm passes through a separator Is and is introduced into the OPO oscillator L5.

The semiconductor laser SL2 generates light which changes the wavelength with a repetition frequency fm which is generated by the modulator MD1 and is slow. The light of the semiconductor laser SL2 which is introduced into the OPO oscillator L5 acts as seed light of the OPO oscillator L5 such that the oscillation frequency of the OPO oscillator agrees with the frequency of the light of the semiconductor laser SL2.

On the other hand, in the OPO crystal light with a wavelength of λ1 and light with a wavelength of λ2 are generated. Since the resonator mirrors M1 to M4 are arranged such that they oscillate by the light with a wavelength of λ1, the light with the wavelength of λ1 is amplified on alternating sides within the resonator and reaches a high field intensity. According to the increased field intensity of the light with a wavelength of λ1 the light with a wavelength of λ2 is amplified. The light with a wavelength of λ1 can therefore be generated with high efficiency.

The mirror M2 of the annular resonator which is used for light emergence is arranged such that for the most part it passes the generated light with a wavelength of λ2. By means of this measure the light with a wavelength of λ2 does not remain within the resonator, and therefore it can be effectively used as emergence light.

From the generated light with a wavelength of λ2 part is reflected by the beam splitter Bs2 and is introduced into the absorption cell Ce2. Since the absorption cell Ce2 is filled with samarium (Sm) atoms and thus a discharge is excited, the incident light is absorbed by the samarium (Sm) atoms.

The light which has passed through the absorption cell Ce2 is determined by the detector Dt12 with a signal which is introduced into the sensitive phase detector D1 of the wavelength control circuit Cn2 and is converted into the signal of the deviation from the center of the absorption line (hereinafter this signal is called the "error signal").

The error signal is amplified with a polarity which causes negative feedback. Furthermore it is added by the output of the modulator MD1 and an adder AD and is applied via a high voltage amplifier AMP to the electrostriction element PZ2 which drives the mirror of the resonator of the semiconductor laser SL2. Thus the signal changes the oscillator wavelength of the semiconductor laser SL2.

In the above described manner the wavelength which is generated by the semiconductor laser SL2 is tuned to 1419.740 nm. The light with a wavelength of λ2 can thus be brought into agreement with the center of the absorption line of samarium (primary wavelength: 472.842 nm).

(12) In FIG. 24 the light with the wavelength of λ2 which has been tuned to the center of the absorption line of samarium (Sm) (primary wavelength: 472.842 nm) is introduced into the nonlinear optical crystal C14 which generates a second harmonic with 236.421 nm. The generated second harmonic is introduced via the dichroic mirror DM1 into the nonlinear optical crystal C4 (CLBO crystal, BBO crystal).

(13) The basic wave (wavelength: 1064.122 nm) described in (3) and the second harmonic (wavelength: 236.421 nm) described in (12) is introduced into the nonlinear optical crystal C4. The nonlinear optical crystal C4 generates a summed frequency thereof (wavelength: 193.443 nm).

COMMERCIAL APPLICATION

As was described above, as claimed in the invention a light source device with a simple arrangement and low degradation of the beam quality can be devised which can be used as a replacement light source for an ArF excimer laser. This light source device can be used for a semiconductor lithography device, surface activating, precision machining (perforation, cutting to size, grooving), perforation of a printed board, installation of nozzles in an inkjet printer, marking and the like.

In the light source device as claimed in the invention, in particular the conversion efficiency can be increased in a means for generating a summed frequency. Thus the heat-induced phase mismatch can be reduced by the means for generating a summed frequency.

What is claimed is:

1. A laser light source device characterized by the following features:
    a solid state laser light source which produces laser light with a wavelength of greater than or equal to 1000 nm and less than or equal to 1800 nm;
    a means for producing a harmonic of the said laser light;
    a coherent light source laser which is excited by the harmonic; and
    a CLBO crystal means for producing laser light of increased intensity with a summed frequency, by vector-phase matching, with a wavelength of roughly 193 nm from the laser light which is emitted from the solid state laser light source, and from coherent light which is emitted from the coherent light source laser,
    wherein the angle between the laser light which is emitted from the first solid state laser light source and the coherent light which is emitted from the coherent light source laser is fixed at vector-phase matching angle of greater than 0 degrees, the two types of light being incident on the CLBO crystal means for producing a summed frequency.

2. A laser light source device as claimed in claim 1, wherein a wavelength stabilization means is provided which stabilizes the wavelengths of the light emitted from the coherent light source.

3. A laser light source device characterized by the following features:
    a first solid state laser light source which produces laser light with a wavelength of greater than or equal to 1000 nm and less than or equal to 1800 nm;
    a second solid state laser light source which produces laser light with a wavelength of greater than or equal to 1000 nm and less than or equal to 1800 nm;

a CLBO crystal for producing a harmonic of the light from the second laser light source;

a coherent light source laser which is excited by said harmonic;

a means for producing a summed frequency which produces laser light of increased intensity with a summed frequency by vector-phase matching with a wavelength of roughly 193 nm from the laser light which is emitted from the first solid state laser light source, and from the coherent light which is emitted from the coherent light source laser; and a timing circuit which controls the timing of the oscillation between the first solid state laser light source and the second solid state laser light source such that the laser light from the first solid state laser light source and the coherent light from the coherent light source laser are incident essentially at the same time on the means for producing a summed frequency wherein the angle between the laser light which is emitted from the first solid state laser light source and the coherent light which is emitted from the coherent light source laser is fixed at at a vector-phase matching angle of greater than 0 degrees, the two types of light being incident on the means for producing a summed frequency.

4. A laser light source device as claimed in claim 3, wherein a wavelength stabilization means is provided which stabilizes the wavelengths of the light emitted from the coherent light source.

5. A laser light source device characterized by the following features:

a solid state laser light source which produces laser light with a wavelength of greater than or equal to 1000 nm and less than or equal to 1800 nm using a solid state crystal which is doped with neodymium ions;

a first means for producing a harmonic which produces a harmonic of the laser light emitted from the solid state laser light source;

a optical parametric oscillator which is excited by the harmonic;

a second means for producing a harmonic which produces a harmonic of the laser light emitted from the optical parametric oscillator; and a CLBO crystal on which the laser light emitted from the solid state laser light source as well as the harmonic of the laser light of the optical parametric oscillator which is emitted by the second means for producing a harmonic are incident, and which produces light with a summed frequency with a wavelength of roughly 193 nm;

wherein the solid state laser light source is formed from a Nd-YVO$_4$ laser light source or a Nd—YAG laser light source or a Nd-YLF laser light source, wherein the angle of incidence of the laser light incident on the CLBO crystal and of a third harmonic of the laser light of the optical parametric oscillator is selected such that the angle of reflection $\Theta ooe$ of the CLBO crystal, as a means for producing laser light of increased intensity from a summed frequency by vector-phase matching, with respect to its crystal axis lies in the following vector-phase matching range:

$$77,4° \leq \Theta ooe \leq 90°.$$

6. A laser light source device as claimed in claim 5, wherein a wavelength stabilization means is provided which stabilizes the wavelengths of the light emitted from the optical parametric oscillator.

7. A laser light source device characterized by the following features:

a first solid state laser light source which produces laser light with a wavelength of greater than or equal to 1000 nm and less than or equal to 1800 nm using a solid state crystal which is doped with neodymium ions;

a second solid state laser light source, a first means for producing a harmonic which produces a harmonic of the laser light which is emitted from the second solid state laser light source;

a titanium-sapphire laser light source which is excited by the harmonic;

a second means for producing a harmonic which produces a harmonic of the laser light which is emitted from the titanium-sapphire laser light source;

a CLBO crystal on which the laser light emitted from the first solid state laser light source as well as the harmonic of the laser light of the titanium-sapphire light source which is emitted by the second means for producing a harmonic are incident, and which produces light of increased intensity with a summed frequency with a wavelength of roughly 193 nm by vector-phase matching; and a timing circuit which controls the timing of the oscillation between the first solid state laser light source and the second solid state laser light source such that the laser light from the first solid state laser light source and the harmonic of the laser light from the titanium-sapphire light source which is emitted from the second means for producing a harmonic coherent light are incident essentially at the same time on the CLBO crystal which produces the light with a summed frequency wherein the solid state laser light source is formed from a Nd-YVO$_4$ laser light source or a Nd—YAG laser light source or a Nd-YLF laser light source, wherein the angle of incidence of the laser light incident on the CLBO crystal and of a third harmonic of the laser light of the titanium-sapphire light source is selected such that the angle of reflection $\Theta ooe$ of the CLBO crystal, as the means for producing a summed frequency by vector-phase matching, with respect to its crystal axis lies in the following vector-phase matching range.

8. A laser light source device as claimed in claim 7, wherein a wavelength stabilization means is provided which stabilizes the wavelengths of the light emitted from the titanium-sapphire laser light source.

9. A laser light source device characterized by the following features:

a first solid state laser light source which produces laser light with a wavelength of greater than or equal to 1000 nm and less than or equal to 1800 a second solid state laser light source which produces laser light with a wavelength of greater than or equal to 1000 nm and less than or equal to 1800 nm;

a means for producing a harmonic which produces a harmonic of the laser light from the second solid state laser light source;

a coherent light source which is excited by the harmonic;

a first means for producing a summed frequency which produces light with a summed frequency from the laser light which is emitted from the first solid state laser light source, and from the coherent light which is emitted from the coherent light source; and a second means for producing a summed frequency which produces a second light of increased intensity by vector-phase matching with a summed frequency with a wavelength of roughly 193 nm from the laser light which is emitted from the first solid state laser light source, and from the light with a summed frequency from the first means for producing a summed frequency; and a timing circuit which controls the timing of the oscillation between the first solid state laser light source and the second solid state laser light source such that the laser light from the first solid state laser light source and the coherent light which is emitted from the coherent light source are incident essentially at the same time on the means for producing a summed frequency, wherein a wavelength stabilization means is provided which stabilizes the wavelengths of the light emitted from the coherent light source utilizing the absorption spectra selected from the group consisting of xenon, argon, krypton and helium.

* * * * *

UNITED STATES PATENT AND TRADEMARK OFFICE
CERTIFICATE OF CORRECTION

PATENT NO.      : 6,477,188 B1
DATED           : November 5, 2002
INVENTOR(S)     : Eiko Takaoka et al.

It is certified that error appears in the above-identified patent and that said Letters Patent is hereby corrected as shown below:

<u>Title page,</u>
Item [30], Foreign Application Priority Data, delete "Sep. 17, 1999" add
-- Sep 17, 1997 --

Signed and Sealed this

Eighth Day of April, 2003

JAMES E. ROGAN
*Director of the United States Patent and Trademark Office*